US007058890B2

(12) United States Patent
George et al.

(10) Patent No.: US 7,058,890 B2
(45) Date of Patent: Jun. 6, 2006

(54) METHOD AND SYSTEM FOR ENABLING CONNECTIVITY TO A DATA SYSTEM

(75) Inventors: David George, Bellevue, WA (US); Joseph Harb, Woodinville, WA (US); Chris Haven, Seattle, WA (US); Dennis Ferry, Snohomish, WA (US); Wen-Hsin Lee, Issaquah, WA (US); Java Srinivasan, Bellevue, WA (US)

(73) Assignee: Siebel Systems, Inc., San Mateo, CA (US)

( * ) Notice: Subject to any disclaimer, the term of this patent is extended or adjusted under 35 U.S.C. 154(b) by 736 days.

(21) Appl. No.: 10/131,368

(22) Filed: Apr. 23, 2002

(65) Prior Publication Data

US 2003/0151633 A1    Aug. 14, 2003

Related U.S. Application Data

(60) Provisional application No. 60/356,713, filed on Feb. 13, 2002.

(51) Int. Cl.
*G06F 15/173*    (2006.01)

(52) U.S. Cl. ............... 715/728; 715/513; 715/738; 715/744; 704/270; 704/270.1

(58) Field of Classification Search ............ 345/864, 345/727, 728, 717, 716, 718, 741, 744, 747, 345/735, 765, 760; 707/513, 514; 709/218, 709/217, 228; 379/88.01; 715/728, 738, 715/744, 513; 704/270, 270.1, 231, 251
See application file for complete search history.

(56) References Cited

U.S. PATENT DOCUMENTS

| 6,336,137 | B1 | 1/2002 | Lee et al. | |
|---|---|---|---|---|
| 6,507,857 | B1 | 1/2003 | Yalcinalp | |
| 6,804,330 | B1 * | 10/2004 | Jones et al. | 379/88.01 |
| 2001/0034733 | A1 | 10/2001 | Prompt et al. | |
| 2001/0037415 | A1 | 11/2001 | Freishtat et al. | |
| 2002/0010715 | A1 * | 1/2002 | Chinn et al. | 707/514 |
| 2002/0054090 | A1 * | 5/2002 | Silva et al. | 345/747 |
| 2002/0059073 | A1 * | 5/2002 | Zondervan et al. | 704/270.1 |
| 2002/0073236 | A1 | 6/2002 | Helgeson et al. | |

(Continued)

FOREIGN PATENT DOCUMENTS

WO    PCT/US03/04802    12/2003

*Primary Examiner*—Tadesse Hailu
(74) *Attorney, Agent, or Firm*—Blakely, Sokoloff, Taylor & Zafman LLP; James W. Soong

(57) ABSTRACT

A method and system that provides filtered data from a data system. In one embodiment the system includes an API (application programming interface) and associated software modules to enable third party applications to access an enterprise data system. Administrators are enabled to select specific user interface (UI) objects, such as screens, views, applets, columns and fields to voice or pass-through enable via a GUI that presents a tree depicting a hierarchy of the UI objects within a user interface of an application. An XSLT style sheet is then automatically generated to filter out data pertaining to UI objects that were not voice or pass-through enabled. In response to a request for data, unfiltered data are retrieved from the data system and a specified style sheet is applied to the unfiltered data to return filtered data pertaining to only those fields and columns that are voice or pass-through enabled.

48 Claims, 26 Drawing Sheets

U.S. PATENT DOCUMENTS

| | | | |
|---|---|---|---|
| 2002/0099738 A1* | 7/2002 | Grant | 707/513 |
| 2002/0103881 A1* | 8/2002 | Granade et al. | 709/218 |
| 2002/0131404 A1 | 9/2002 | Mehta et al. | |
| 2002/0194388 A1* | 12/2002 | Boloker et al. | 709/310 |
| 2003/0046316 A1* | 3/2003 | Gergic et al. | 707/513 |
| 2003/0071833 A1* | 4/2003 | Dantzig et al. | 345/700 |
| 2003/0125023 A1* | 7/2003 | Fishler | 455/426 |
| 2004/0010412 A1* | 1/2004 | Chiu | 704/270.1 |

* cited by examiner

```
<PAGE_TAB
    INACTIVE="N"
    NAME="Siebel Voice Employee Screen"
    SCREEN="Siebel Voice Employee Screen"
    SEQUENCE="6"
    UPDATED="01/16/2002 13:21:49"
    UPDATED_BY="SADMIN"
    CREATED="01/08/2002 11:35:59"
    CREATED_BY="SADMIN">
            <PAGE_TAB_LOCALE
                INACTIVE="N"
                LANGUAGE_CODE="ENU"
                NAME="ENU"
                TEXT="Employees"
                TRANSLATE="Y"
                UPDATED="01/10/2002 11:28:50"
                UPDATED_BY="SADMIN"
                CREATED="01/08/2002 11:36:33"
                CREATED_BY="SADMIN">
            </PAGE_TAB_LOCALE>
</PAGE_TAB>
<PAGE_TAB
```

*FIG. 9*

| Application Representation | | | Subscription Data | |
|---|---|---|---|---|
| View | Applet | Column/Field | Voice Enable | Grammar Update Enable |
| ⋮ | | | | |
| Sales Accounts (250) | | | Yes | Yes |
| ⋮ | | | ⋮ | ⋮ |
| | 275 ∿ Account List Applet | | Yes | No |
| | | New | Yes | No |
| | | Name | Yes | No |
| | | Site | No | No |
| | | Main Phone # | Yes | No |
| | | Territories | No | No |
| | 276 ∿ More Info Account Entry | ⋮ | ⋮ | ⋮ |
| | | | Yes | No |
| | | Name (285) | Yes | No |
| | | Main Phone # | Yes | No |
| | | Address Line 1 | No | No |
| | | Address Line 2 | No | No |
| | | City | Yes | No |
| | 279 ∿ Activities Account Entry | ⋮ | ⋮ | ⋮ |
| | 281 ∿ Assets Account Entry | ⋮ | ⋮ | ⋮ |
| | 283 ∿ Attachments Account Entry | ⋮ | ⋮ | ⋮ |
| | 280 ∿ Contacts Account Entry | | Yes | Yes |
| | | 287 ∿ Personal Title | No | No |
| | | 289 ∿ Last Name | Yes | Yes |
| | | First Name | Yes | Yes |
| | | Job Title | No | No |
| | | Phone # | Yes | No |
| | | Fax # | No | No |
| | | Pager Phone # | No | No |
| | | Street Address 1 | Yes | No |
| | | Street Address 2 | Yes | No |
| | | State | Yes | No |
| | | City | Yes | No |
| | | Postal Code | No | No |
| | | Country | Yes | No |
| | | E-mail Address | No | No |
| | | Alias | No | No |
| | | Home Phone # | No | No |
| | | Division | No | No |
| | | Employee | No | No |
| ⋮ | | ⋮ | ⋮ | ⋮ |
| Sales Contacts | | | Yes | Yes |
| ⋮ | | | | |

*FIG. 12*

| Application Representation | | | Subscription Data | |
| --- | --- | --- | --- | --- |
| View | Applet | Column/Field | Pass-through (UI) Enable | Update Enable |
| ⋮ | 250 | | | |
| Sales Accounts | | | Yes | Yes |
| | ⋮ | | | |
| | 275 — Account List Applet | | Yes | No |
| | | New | Yes | No |
| | | Name | Yes | No |
| | | Site | No | No |
| | | Main Phone # | Yes | No |
| | | Territories | No | No |
| | 276 — | ⋮ | ⋮ | ⋮ |
| | More Info Account Entry | | Yes | No |
| | | Name — 285 | Yes | No |
| | | Main Phone # | Yes | No |
| | | Address Line 1 | No | No |
| | | Address Line 2 | No | No |
| | | City | Yes | No |
| | 279 — Activities Account Entry | ⋮ | ⋮ | ⋮ |
| | 281 — Assets Account Entry | | ⋮ | ⋮ |
| | 283 — Attachments Account Entry | ⋮ | ⋮ | ⋮ |
| | 280 — Contacts Account Entry | | Yes | Yes |
| | | 287 — Personal Title | No | No |
| | | 289 — Last Name | Yes | Yes |
| | | First Name | Yes | Yes |
| | | Job Title | No | No |
| | | Phone # | Yes | No |
| | | Fax # | No | No |
| | | Pager Phone # | No | No |
| | | Street Address 1 | Yes | No |
| | | Street Address 2 | Yes | No |
| | | State | Yes | No |
| | | City | Yes | No |
| | | Postal Code | No | No |
| | | Country | Yes | No |
| | | E-mail Address | No | No |
| | | Alias | No | No |
| | | Home Phone # | No | No |
| | | Division | No | No |
| | | Employee | No | No |
| | ⋮ | ⋮ | ⋮ | ⋮ |
| Sales Contacts | | | Yes | Yes |
| ⋮ | | | | |

*FIG. 12A*

```xml
<?xml version="1.0" encoding="windows-1252"?>
<APPLICATION NAME="application name">
  <SCREEN CAPTION="caption" NAME="screen name">
    <VIEW TITLE="title" NAME=" view name">
      <APPLET ROW_COUNTER="n - N of X" NO_DELETE="TRUE | FALSE"
        NO_EXEC_QUERY="TRUE | FALSE" NO_UPDATE="TRUE | FALSE" MODE="Base"
        TITLE="applet title" NO_INSERT="TRUE | FALSE" CLASS="CSSSWEFrameLotList"
        NO_MERGE="TRUE | FALSE" ACTIVE="TRUE | FALSE" ID="N" NAME="applet name">
        <LIST>
          <RS_HEADER>
            <COLUMN CALCULATED=" TRUE | FALSE"
              LIST_EDITABLE="Y | N" HTML_TYPE="Field"
              FIELD="Accept Less" HIDDEN="TRUE | FALSE" DATATYPE="text"
              TEXT_LENGTH="255" TYPE="Field" ID="N"
              REQUIRED="TRUE | FALSE" READ_ONLY="TRUE | FALSE"/>
          </RS_HEADER>
          <RS_DATA>
            <ROW SELECTED="TRUE | FALSE" ROWID="id number1">
              <FIELD VARIABLE="column name" NAME="field name1">
              field value1
              </FIELD>
              ...
              <FIELD VARIABLE="column name" NAME="field nameN">
              field valueN
              </FIELD>
            </ROW>
            ...
            <ROW SELECTED="TRUE | FALSE" ROWID="id number1">
              <FIELD VARIABLE="column name" NAME="field name1">
              field value1
              </FIELD>
              ...
              <FIELD VARIABLE="column name" NAME="field nameN">
              field valueN
              </FIELD>
            </ROW>
          </RS_DATA>
        </LIST>
      </APPLET>
    </VIEW>
  </SCREEN></APPLICATION>
```

*FIG. 16*

```
<? xml version="1.0" encoding="windows -1252" ?>
<APPLICATION NAME ="Siebel Sales Enterprise">
  <USER_AGENT MARKUP="HTML" TYPE ="IE 5.5" />
  <SCREEN CAPTION ="Contacts" NAME = "Screen">
    <VIEW TITLE="My Contacts " NAME="Visible
        Contact List View ">
      <APPLET MODE ="Edit List" ROW_COUNTER ="1 - 7 of 7+"
        NO_INSERT ="FALSE"
        CLASS ="CSSFrameListBase" TITLE=" Contacts" ID="2"
        NO_MERGE ="FALSE" NO_DELETE ="FALSE"
        NO_UPDATE ="FALSE" NO_EXEC_QUERY ="FALSE"
        NAME=" Contact List Applet ">
        <LIST>
          <RS_HEADER>
            ⋮
            <RS_DATA>
            ⋮
            </RS_DATA>
          </RS_HEADER>
        </LIST>
      </APPLET>
    </VIEW>
  </SCREEN>
</APPLICATION>
```

FIG. 17

```
<RS_HEADER>
  <COLUMN HTML_TYPE="Field" DISPLAY_NAME="Work Phone #"
   TEXT_LENGTH="40" DATATYPE="phone" NUMBER_BASED="FALSE"
   ID="506" READ_ONLY="FALSE" REQUIRED="FALSE" TYPE="Field"
   CALCULATED="FALSE" FIELD="Work Phone #" NAME="Work Phone #" />

<COLUMN HTML_TYPE="Field" DISPLAY_NAME="Close Date"
   TEXT_LENGTH="32" DATATYPE="date" ID="508" READ_ONLY="FALSE"
   REQUIRED="TRUE" FORMAT="M/D/YYYY" CALCULATED="FALSE"
   FIELD="Primary Revenue Close Date" NAME="Primary Revenue Close Date" />

<COLUMN HTML_TYPE="Field" DISPLAY_NAME="Revenue"
   TEXT_LENGTH="25" DATATYPE="currency" LIST_EDITABLE="Y" ID="510"
   READ_ONLY="FALSE" REQUIRED="FALSE"
   FORMAT="($###,###,###,###,##0.)" CALCULATED="FALSE" FIELD="Primary
   Revenue Amount" NAME="Primary Revenue Amount" />
</RS_HEADER>
```

FIG. 18

```
                    392                        393
  <RS_DATA>
   -<ROW ROWID="12-WFJ4D" SELECTED="TRUE" >
394   <FIELD VARIABLE="LastName" NAME="Last
(TYP)     Name">Aamot</FIELD>
      <FIELD VARIABLE="FirstName" NAME="First
          Name">Gina</FIELD>
      <FIELD VARIABLE="MiddleName" NAME="Middle
          Name" />                     395 (TYP)
396 (TYP) <FIELD VARIABLE="JobTitle" NAME="Job
          Title">IT Manager</FIELD>
      <FIELD VARIABLE="StreetAddress" NAME="Street
          Address">Lady's Well Brewery, Leitrim
          Street</FIELD>
      <FIELD VARIABLE="StreetAddress2"
          NAME="Street Address 2" />
      <FIELD VARIABLE="City"
          NAME="City">Cork</FIELD>
      <FIELD VARIABLE="State" NAME="State" />
      <FIELD VARIABLE="PostalCode" NAME="Postal
          Code">NONE</FIELD>
      <FIELD VARIABLE="MailStop" NAME="Mail Stop"
          />
      <FIELD VARIABLE="WorkPhoneNum"
          NAME="Work Phone #">(614) 343-
          8700</FIELD>
      <FIELD VARIABLE="CellularPhoneNum"
          NAME="Cellular Phone #">(650) 235-
          9845</FIELD>
      <FIELD VARIABLE="EmailAddress" NAME="Email
          Address">Gina_Aamot@aep.com</FIELD>
   </ROW>
  </RS_DATA>
```

*FIG. 19*

METHOD AND SYSTEM FOR ENABLING CONNECTIVITY TO A DATA SYSTEM

RELATED APPLICATIONS

The present application is based on a provisional application entitled "METHOD AND SYSTEM FOR ENABLING VOICE CONNECTIVITY TO A DATA SYSTEM," Ser. No. 60/356,713, filed on Feb. 13, 2002, the benefit of the filing date of which is claimed under 35 U.S.C. §119(e).

BACKGROUND OF THE INVENTION

1. Field of the Invention

The present invention relates to data systems in general, and an interface to provide filtered data from a data system in particular. In one embodiment, the interface facilitates voice access to a data system.

2. Background Information

Recently, the development of new technologies in the telephony and speech recognition areas has enabled data systems to be accessed via voice (e.g., spoken verbal input). Such voice-enabled data systems let users navigate to request a particular piece of data or a related set of data using voice commands, and then "reads back" the data to the user. These types of data systems are widely used in information systems in various industries, including banking, insurance, investments, etc.

In general, in order to provide voice access to a data system, a complete voice interface has to be developed from scratch. This typically involves integrating various hardware and software components, such as telephony interfaces, multi-channel access equipment, speech recognition software, text-to-speech (TTS) software and hardware, and other related components. In addition, a dedicated application must be written to interact with the various hardware and software components, and to provide interface and navigation facilities for voice access. This can be a very daunting task, requiring a team of IT professionals that are savvy in many specialized areas.

Several vendors now provide integrated voice-access systems that handle the voice-to-computer aspects of a voice-enabled data system. For example, these integrated systems handle telephony connectivity to a phone network, perform speech recognition to convert voice commands and verbalized data requests to a computer-readable form (e.g., ASCII text or binary text form), and handle the TTS functions.

Although these integrated voice-access systems provide a lot of the workload, they still require an application program to enable access to the data system. Typically, the application program is data-system specific, requiring specific navigation and database queries to be written. As a result, the inner-workings of the data system need to be known in detail.

In view of the foregoing, it would be advantageous to provide an "interface" that would enable data system vendors and third parties to easily integrate voice access to existing data systems by using an integrated voice-access system combined with an application program that is much simpler to implement and doesn't require all of the inner-workings of the data system to be known.

In addition to voice access systems, there are many other instances in which it would be advantageous to access selected data sets from within data systems. For example, many data systems provided integrated access interfaces, such as client user interfaces, to enable users to access data stored in the data system via a client computer connected to the data system via a computer network. Generally, these client user interfaces are provided by the data system vendor, and generally provide a limited, predetermined set of user interface objects, such as screens, lists and forms. In contrast, a third party vendor or business enterprise may desire to build a customized user interface for the data system. To facilitate such implementations, it would be advantageous to provide a mechanism to retrieve filtered data from data systems.

SUMMARY OF THE INVENTION

A method and system that provides filtered data from a data system. In one embodiment the system includes an API (application programming interface) and associated software modules to enable third party applications, such as voice applications, to access an enterprise data system. Administrators are enabled to select specific user interface (UI) objects, such as screens, views, applets, columns and fields to voice or pass-through enable via a graphical user interface (GUI). The GUI presents a tree depicting a hierarchy of the UI objects within a user interface of an application that is used to access a data system. An XSLT style sheet is then automatically generated to filter out data pertaining to UI objects that were not voice or pass-through enabled. The third party application accesses the data system using a data query request and one of the data system's existing interfaces, such as an HTTP or HTTPS interface, a COM interface, or a Java interface. In response to the request, unfiltered data are retrieved from the data system and a specified style sheet is applied to the unfiltered data to return filtered data pertaining to only those UI objects that are voice or pass-through enabled.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 9 is a code listing corresponding to an exemplary portion of a repository file;

FIG. 12 shows a portion of an application representation that corresponds to the Sales Accounts view of FIG. 11 and corresponding subscription data;

FIG. 12A shows the application representation of FIG. 12 corresponding to an implementation in which the subscription data pertains to pass-through enabled UI objects, and update-enabled UI objects;

FIG. 13 is a representation of a graphical user interface window that enables an administrator to select UI objects to voice enable and to provide grammar update support for;

FIG. 16 is an XML listing illustrating a typical format of an XML output document that is returned to a voice application in accordance with one embodiment of the invention.

FIG. 17 is an outlined XML listing having a format corresponding to the XML listing of FIG. 16 to illustrate the various hierarchical levels of the XML output document;

FIG. 18 is an XML code portion listing illustrating details of an RS_HEADER section of the XML output document;

FIG. 19 is an XML code portion listing illustrating details of an RS_DATA section of the XML output document;

DETAILED DESCRIPTION OF THE ILLUSTRATED EMBODIMENTS

A system and method for providing filtered data from a data system is described in detail herein. In the following description, numerous specific details are disclosed, such as exemplary software and system architectures, to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a system and method for providing filtered data from a data system to a requesting component, such as a third party application. In the following discussion, details of embodiments pertaining to a voice access system are disclosed. The voice access system is used to illustrate a general data system access architecture in accordance with the invention. Accordingly, the use of the principles and teachings of the invention are not to be limited to voice access systems, but may be applied to any application or system outside of a data system that desires to receive filtered data from the data system.

Figure 1:
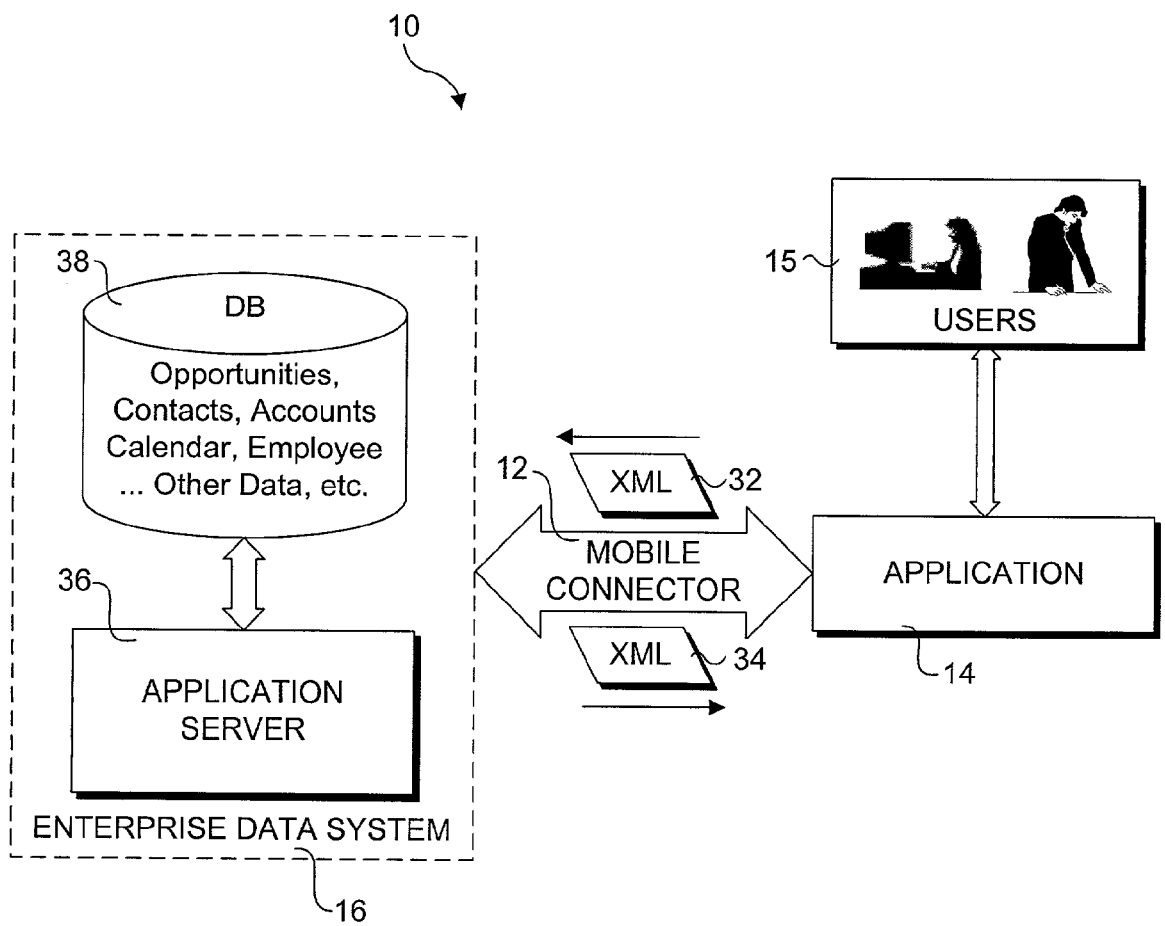
FIG. 1 is a schematic block diagram illustrating a high-level architecture in accordance with one embodiment of the invention in which a mobile connector interface enables third party applications to access an enterprise data system.

A high-level architecture 10 in accordance with one embodiment of the invention is shown in FIG. 1. At the center of architecture 10 is a mobile connector interface 12 that enables third parties (referred to herein as "application vendors") to develop applications 14 that enable users 15 to access data stored in an enterprise data system 16.

In one embodiment, mobile connector interface 12 provides a mechanism for interacting with enterprise data system 16 via XML (extended markup language) data in accordance with predefined protocol and data formats that define parameters pertaining to the transferred XML data. These data include incoming XML data 32, which typically comprise XML data prescribing a data request that is received by enterprise data system 16, and outgoing XML data 34, which typically comprises XML data pertaining to data returned in response to the data request by enterprise data system 16.

In one embodiment, enterprise data system 16 includes an application server 36, which logically represents a collection of (generally) distributed software components and modules that define the business logic to enable external systems and users to access various data stored in a database 38 that hosts the data for the enterprise data system based on a pre-defined set of interfaces. Further details of the software components and modules corresponding to application server 36 are described below.

Typically, the enterprise data system will provide various means to access the data that it stores, such as client connections, as will be understood by those skilled in the database/data system arts. Ideally, it is desired to enable voice access to the enterprise system in a manner that is substantially transparent to it. In one embodiment, each connection provided by the mobile connector appears to the enterprise data system as a "normal" client connection, and as such, does not require any changes to the core software components that support the enterprise data system.

Figure 2:
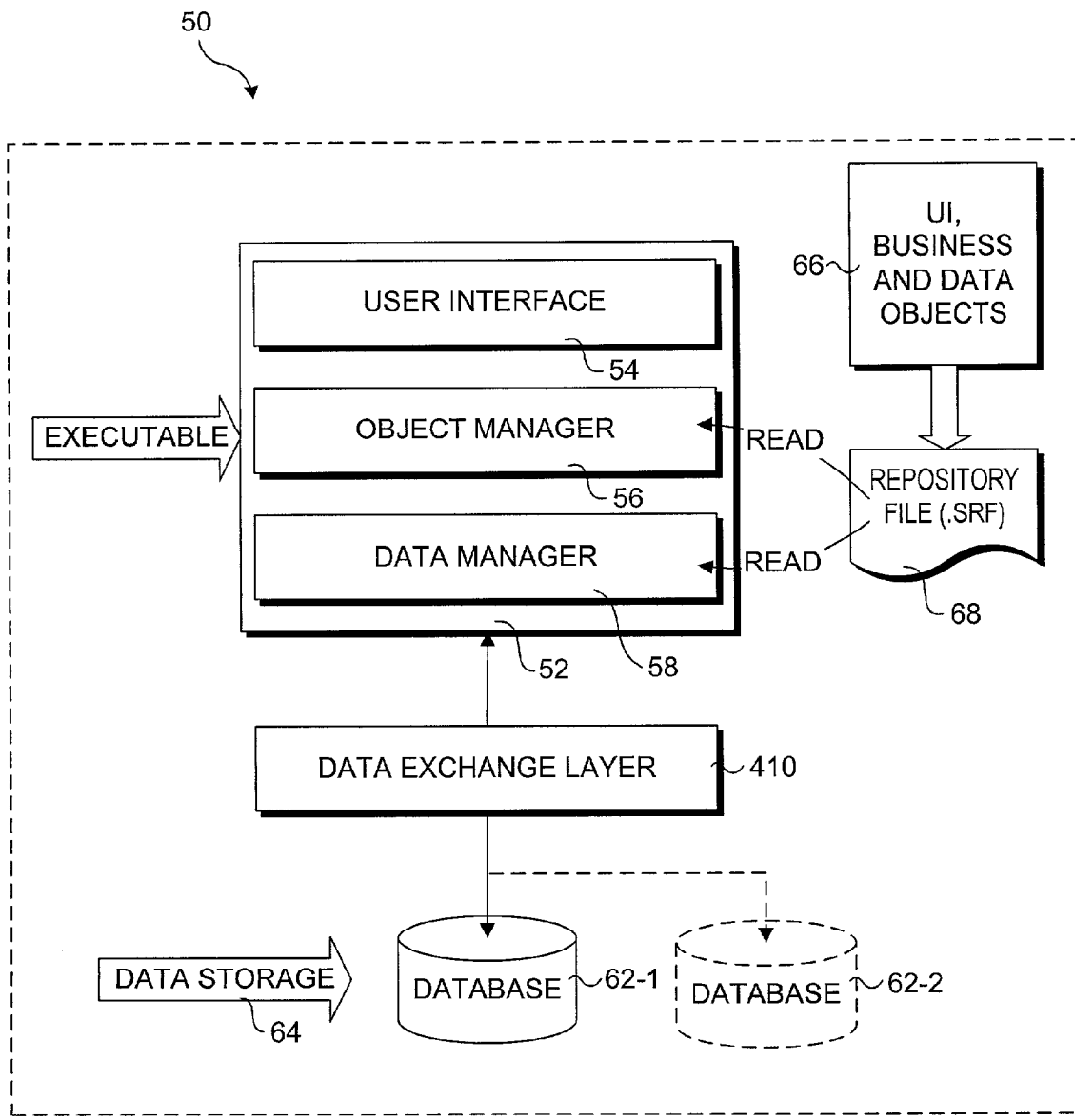
FIG. 2 is a block schematic diagram illustrating a multi-layer software architecture in accordance with one embodiment of the invention.

In one embodiment, software corresponding these core software components that control normal operations of enterprise data system 16 (i.e., operations involving interaction with the enterprise data system outside of voice access operations) can be logically structured as a multi-layered architecture 50, as shown in FIG. 2. In one embodiment, the logical multi-layered architecture provides a platform for common services 52 to support various applications that implement the architecture. These services may be logically partitioned into a user interface layer 54, an object manager layer 56, a data manager layer 58, and a data exchange layer 60.

In one embodiment, user interface layer 54 provides the screens, views, and applets that make up various user interfaces that are rendered on client machines that connect to the enterprise data system via a computer network based client connection to enable users of those client machines to interact with the enterprise data system. Generally, user interface layer 54 may be configured to support various types of clients, including traditional connected clients, remote clients, thin clients over an Intranet, Java thin clients on non-Windows-based operating systems, and HTML clients over the Internet, etc.

Object manager layer 56 is designed to manage one or more sets of business rules or business concepts associated with one or more applications and to provide the interface between user interface layer 54 and data manager layer 58. In one embodiment, the business rules or concepts can be represented as business objects. In one embodiment, the business objects may be designed as configurable software representations of the various business rules or concepts applicable to the data services provided by the embodiments of the invention described herein, as explained below in further detail.

Data manager layer 58 is designed to maintain logical views of underlying data stored in one or more databases 62 (e.g., database 38) corresponding to a data storage layer 64, while allowing the object manager to function independently of the underlying data structures or tables in which data are stored. In one embodiment, the data manager provides certain database query functions, such as generation of structure query language (SQL) in real time to access the data. In one embodiment, data manager 68 is designed to operate on object definitions 66 stored in a repository file 68 corresponding to a database schema used to implement the data model for the system, as described in further detail below. Generally, the data exchange layer is designed to handle the interactions with one or more specific target databases and provide the interface between the data manager and those databases, via either generic (e.g., Open Database Connectivity (ODBC)) or native (e.g., Oracle Connection Interface (OCI)) database interface protocols.

Figure 3:
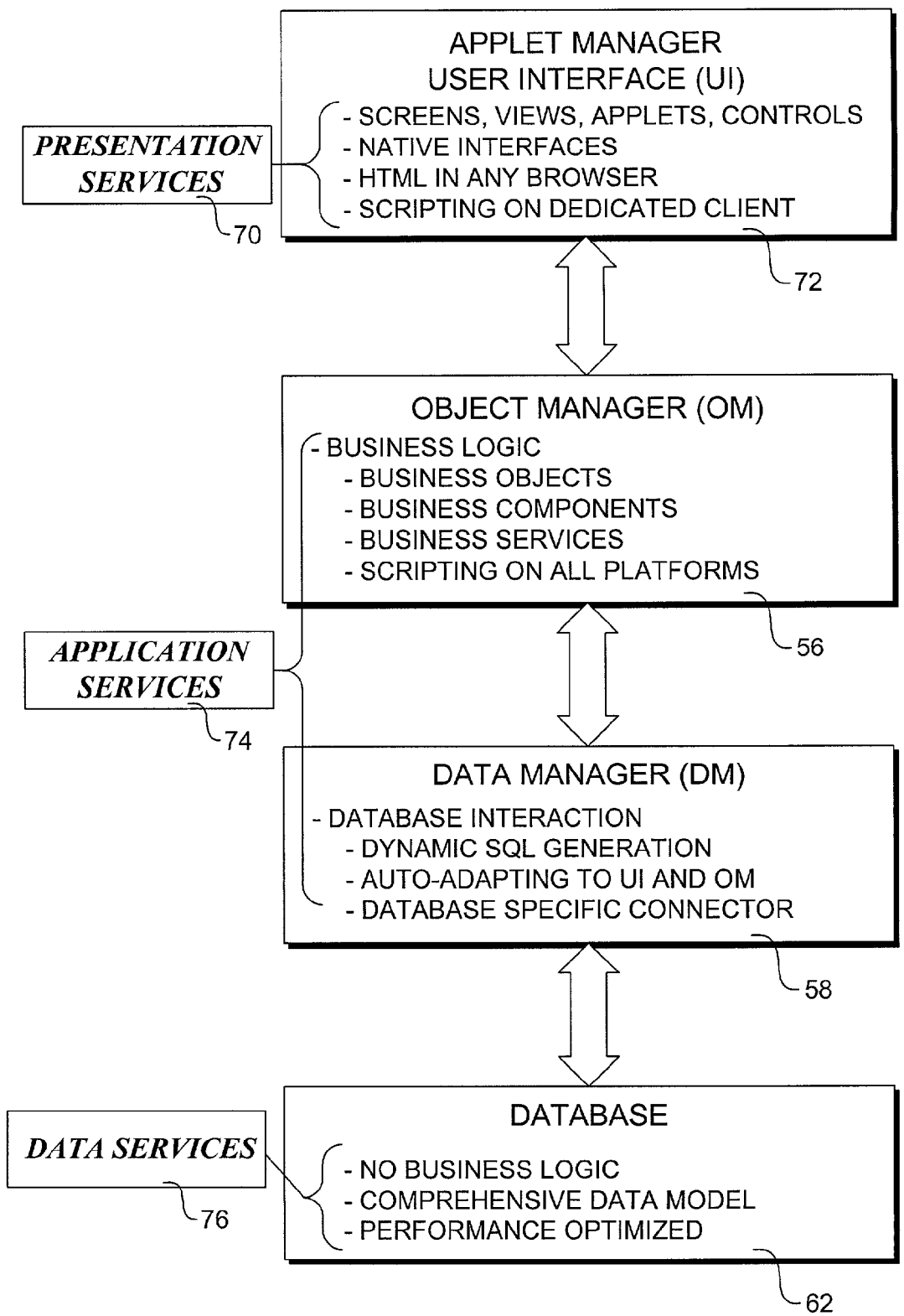
FIG. 3 is a block schematic diagram illustrating further details of the multi-layer software architecture of FIG. 2.

FIG. 3 shows a block diagram illustrating another logical representation of a multi-layered architecture corresponding to the core operations of the enterprise data system. Again, the multi-layered architecture as illustrated in FIG. 3 provides the platform for various common services and is designed and configured to support the various core operations provided by the enterprise data system. In one embodiment, these various services include a presentation services layer 70 corresponding to services provided by an applet manager and user interface 72, an application services layer 74 corresponding to services provided by object manager layer 56 and data manager layer 58, and a data services layer 76 corresponding to services provided by database 62.

In one embodiment, presentation services 70 may be designed and configured to support various types of clients and may provide them with user interface screens, views and applets. In one embodiment, application services 74 may include business logic services and database interaction services. In one embodiment, business logic services provide the class and behaviors of business objects and business components implemented by the application services. In one embodiment, database interaction services may be designed and configured to take the user interface (UI) request for data from a business component and generate the appropriate database commands (e.g., SQL queries, etc.) to satisfy the request. For example, the data interaction services may be used to translate a call for data into RDBMS-specific SQL statements.

Figure 4:
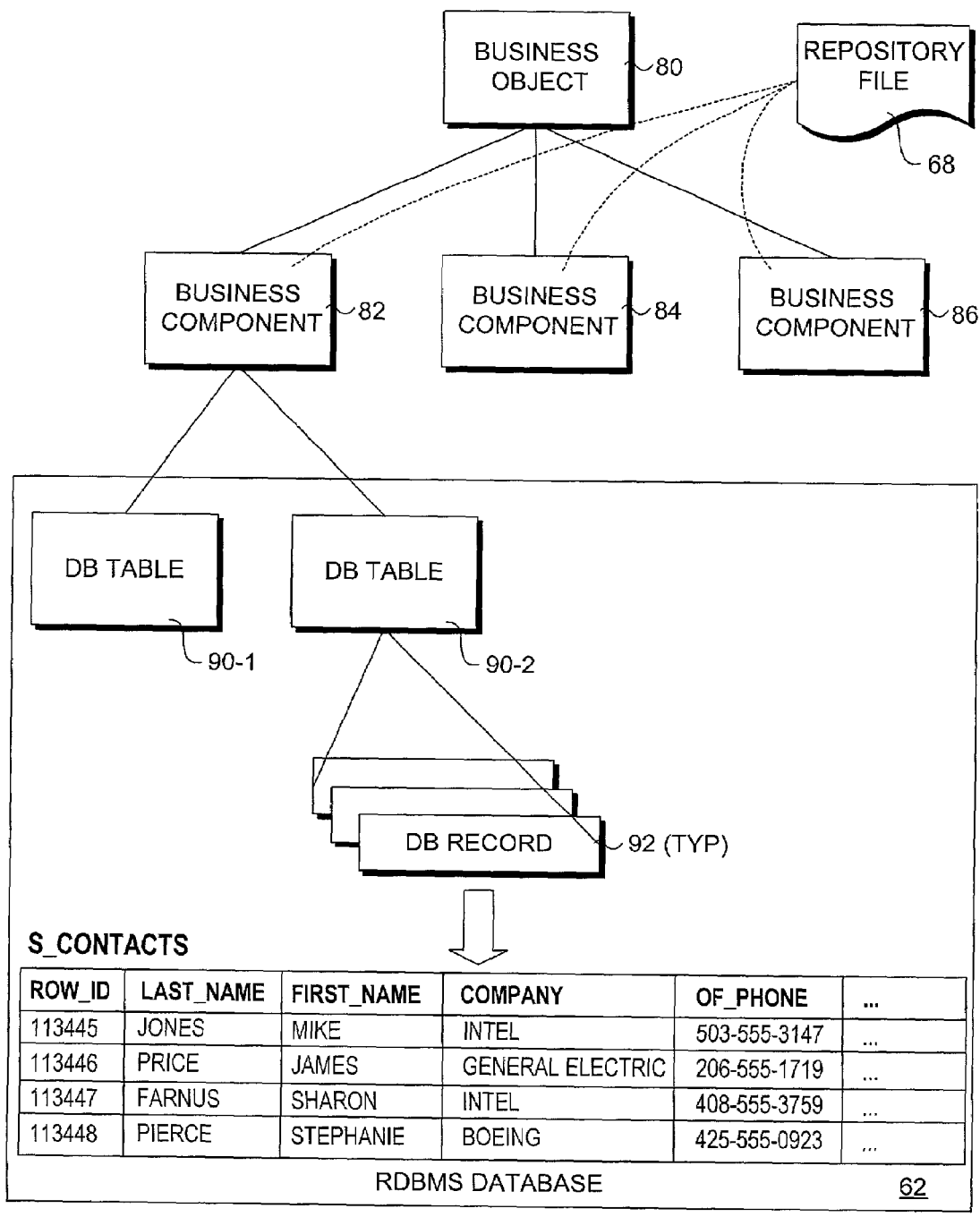
FIG. 4 is a block schematic diagram illustrating further details of various object manager objects in accordance with the multi-layer software architecture.

A multi-layer architecture illustrating the relationships between business objects, business components, and database tables is shown in FIG. 4. A business object 80 sifting at the top layer passes various data access requests to business components 82, 84, and 86 to retrieve data pertaining to the business object from a database 88. For example, business object 80 may pertain to a contact object and business components 82, 84, and 86 are used to access data in a database 62 pertaining to contacts.

In one aspect, business components are objects that span data from one or more physical database tables and calculated values by referencing a base table and explicitly joining and linking other tables, including intersection tables, as depicted by tables 90-1 and 90-2, each of which include a plurality of records 92. As explained in further detail below, each business component contains information for mapping to various data stored in those tables. More specifically, these mappings are between a requested object, such as a subject, and information pertaining to that object that are stored in the database table(s) to which the business component corresponds. In one embodiment, database schema information stored in repository file 68 is used by the business components in determining their table mappings.

Figure 5:
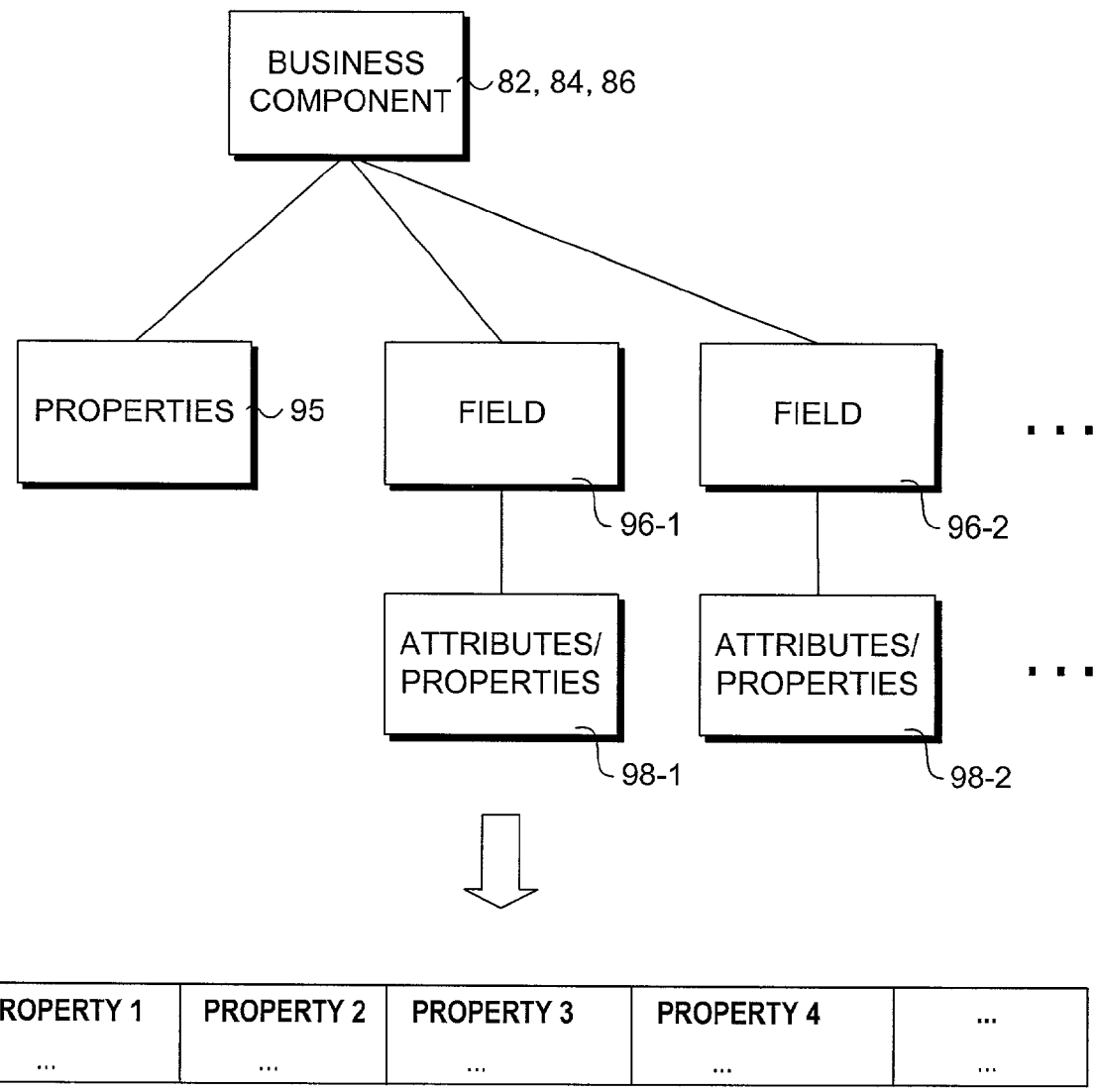
FIG. 5 is a block schematic diagram illustrating further details of a business component as used in the multi-layer software architecture.

A block diagram of a logical structure of a business component in accordance with one embodiment of the present invention is shown in FIG. 5. Each business component (e.g., 82, 84, 86) may include a set of properties 95 that pertain to the respective business component (e.g., NAME, which specifies the logical name of the business component, TABLE NAME, which specifies the actual name of the underlying table, etc.). A business component also includes a set of fields 96, each of which may have a set of associated attributes or properties 98. For example, a field may include a NAME property that identifies the name of the field, a COLUMN NAME property that identifies the column of the underlying table to which the respective field is mapped, etc.

Figure 1A:
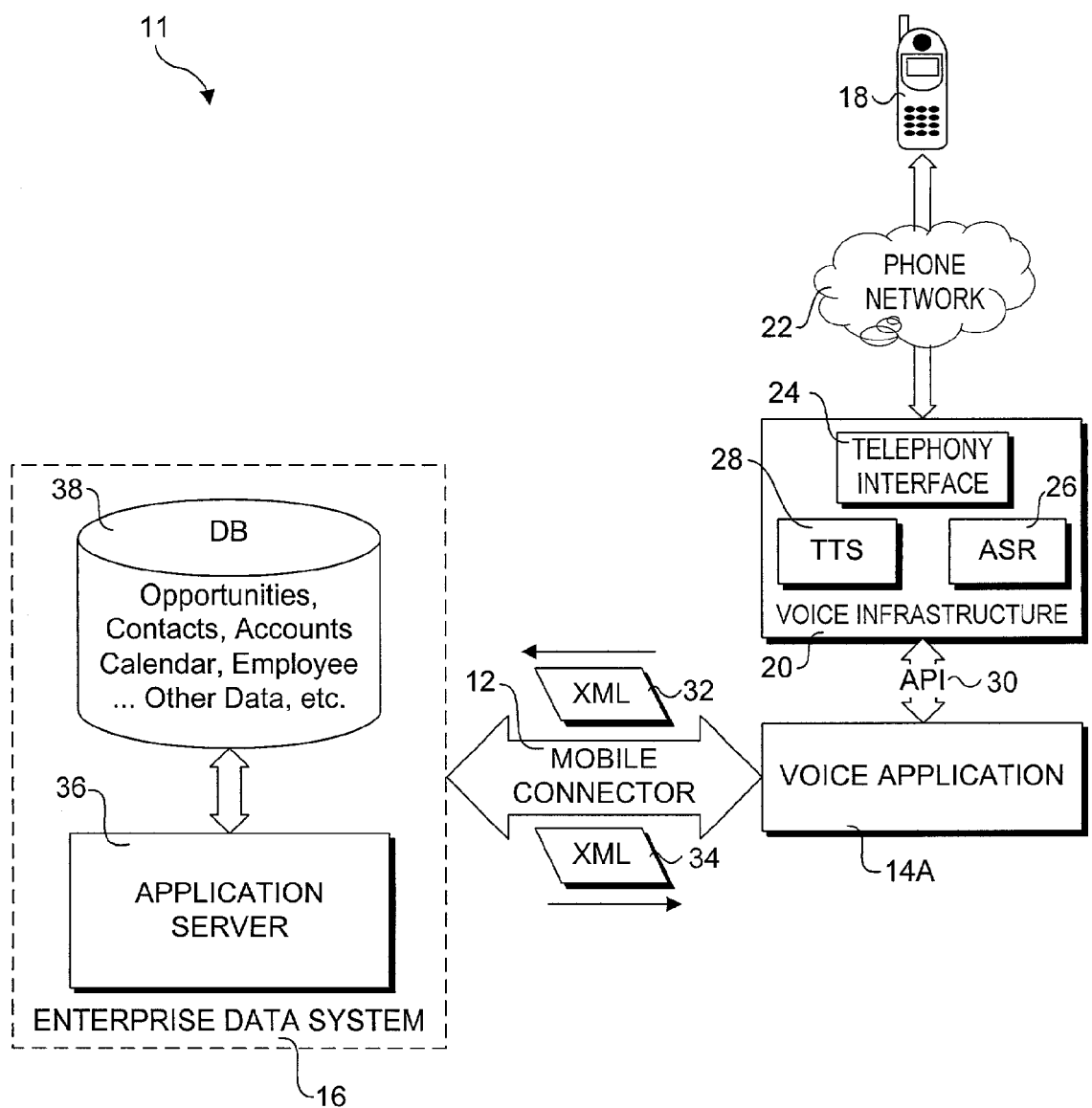
FIG. 1A is a schematic block diagram illustrating the architecture of an exemplary implementation of the mobile connector interface to enable voice access to an enterprise data system.

A high-level architecture 11 in accordance when an exemplary voice access system implementation of the invention is shown in FIG. 1A. In this implementation a voice application 14A uses mobile connector interface 12 to enable users to verbally access data stored in an enterprise data system 16 via a phone 18. In further detail, a user of phone 18 is connected to a voice infrastructure component 20 via a phone network 22, such as a wireless phone network, land-line phone network, or the combination of the two. The voice infrastructure includes various hardware and software components that enable users to interact with voice application 14A via voice commands. Typically, these components will include a telephony interface 24, an automated speech recognition (ASR) component 26, and a text-to-speech (TTS) component 28. In one embodiment, voice application 14A uses a standard application programming interface 30 that enables the voice application to interact with voice infrastructure 20 using a predefine set of commands and data protocols specific to various voice access products. At present, several vendors provide voice access products that provide operations and services corresponding to voice infrastructure 20, including Avaya corporation (formerly Lucent) (telephony interfaces/PXB switching) and Nuance corporation, Salt Lake City, Utah (speech recognition software).

The specific details and inner-workings of the voice infrastructure are beyond the scope of the invention. For the purpose of implementing architecture 11, it is assumed that an integrated voice access system will be deployed and/or the IT professionals who implement the system have sufficient knowledge and skill to set up the voice infrastructure using readily available hardware and software components, such as those described above.

Figure 6:
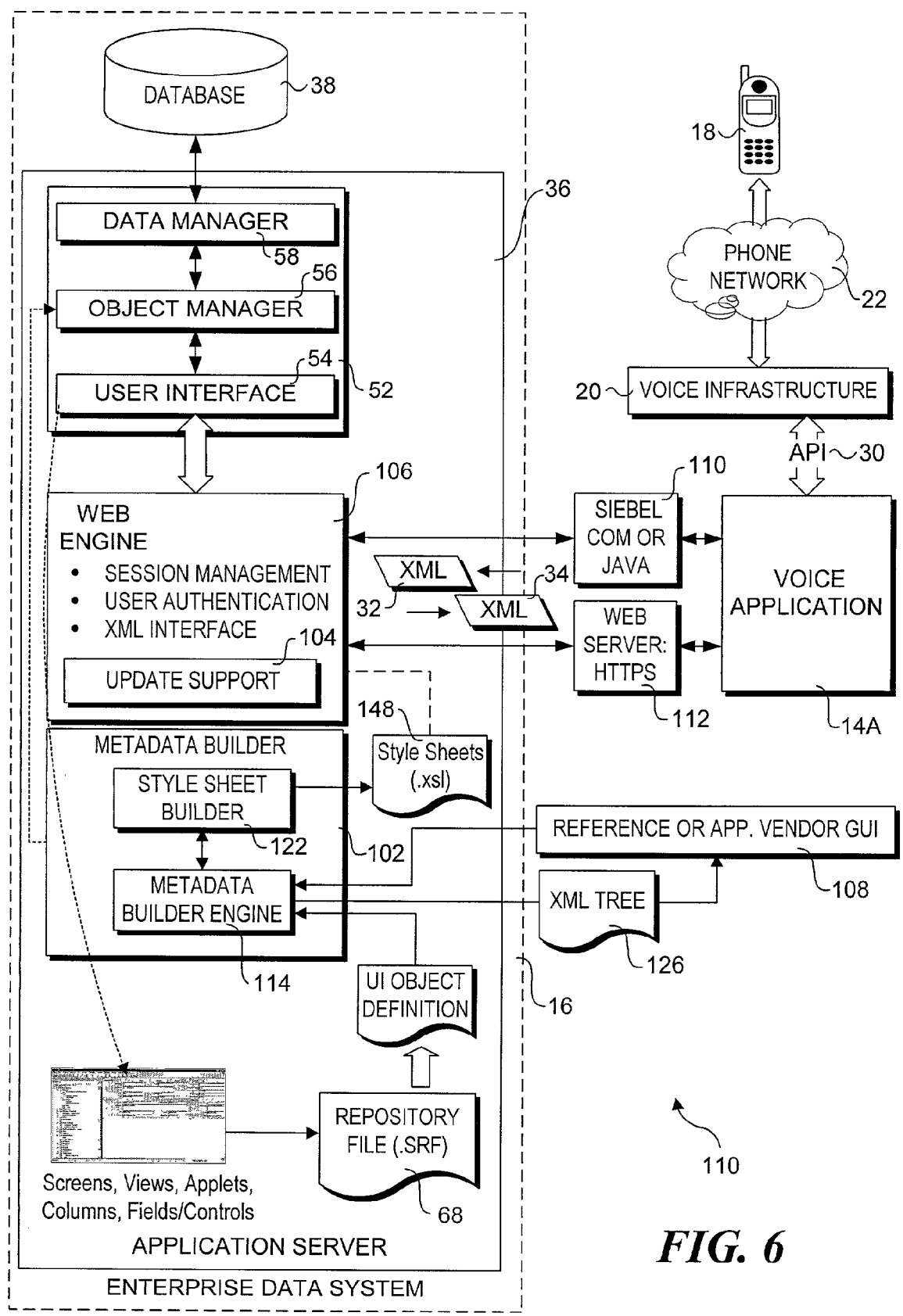
FIG. 6 is a block schematic diagram illustrating further details of the architecture of FIG. 1

An architecture 100 illustrating further details of mobile connector interface 12 and other related components is shown in FIG. 6. The mobile connector interface comprises two separate but related components, including a Metadata Builder 102 and an Update Support component 104. The Metadata Builder is an administrative tool that will generally be run during an initial installation and may be run again if the object definitions 66 stored in the repository file have changed. The Update Support component is a runtime component that is run at the discretion of voice application 14A, as explained below in further detail.

In addition to Metadata Builder 102 and Update Support component 104, architecture 100 further includes a Web engine 106, a reference or application vendor GUI (graphical user interface) component 108, a Siebel® COM or Java interface 110 and a HTTP(S) interface 112. Web engine 106 is used to provide an interface between voice application 14A and common services 52 via either Siebel® COM or Java interface 110 or HTTP(S) interface 112. In one embodiment, Web engine 106 provides an XML interface that enables application server 36 to receive incoming XML data 32 and send outgoing XML data 34.

Figure 7:
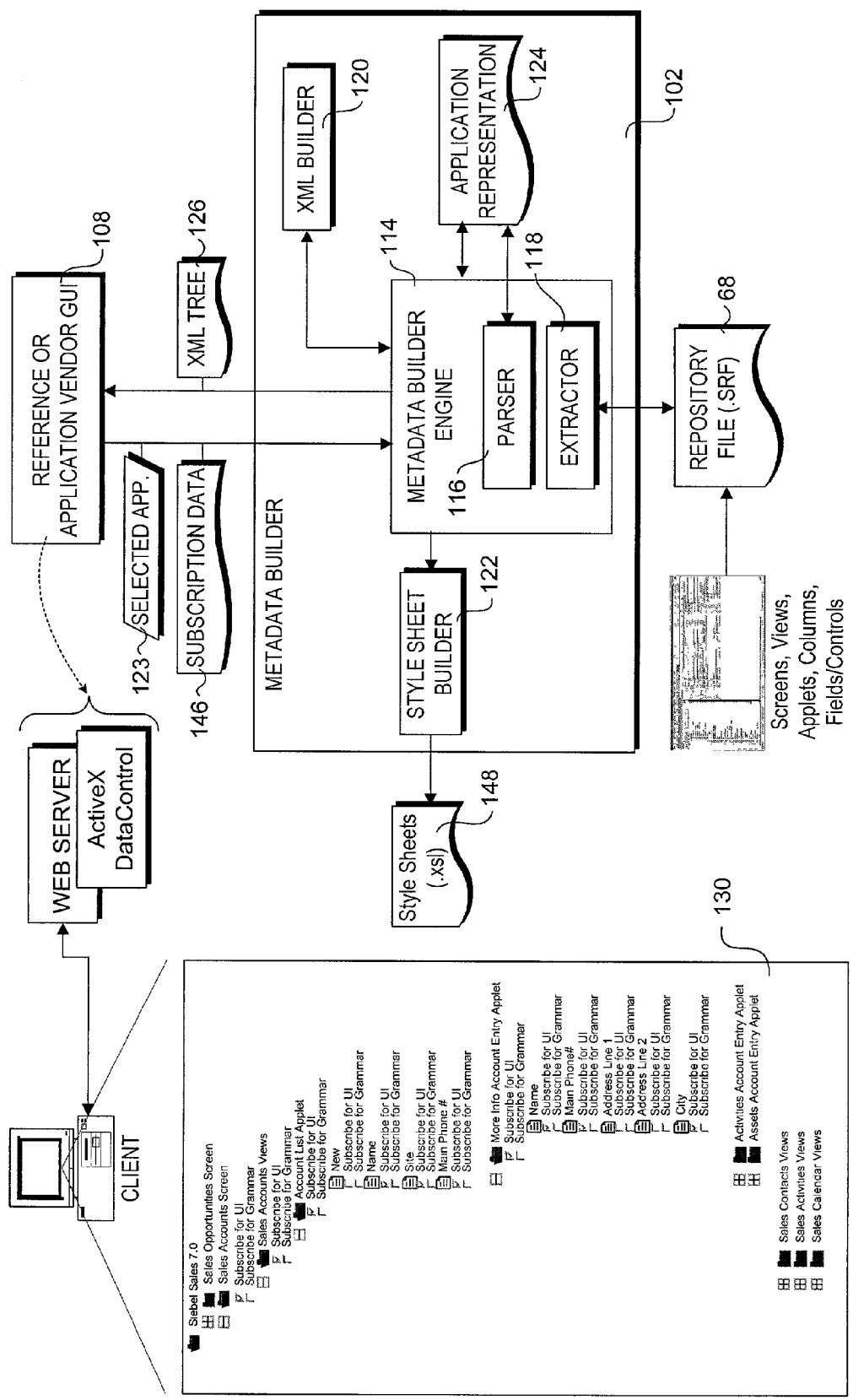
FIG. 7 is a block schematic diagram illustrating details of a voice metadata builder component in accordance with one embodiment of the invention.

The reference or application vendor GUI in combination with the metadata builder enables the application vendor to select which screens, views, applets, columns, and controls/fields an application (e.g., voice application 14A) may access through appropriate XML queries that are submitted as incoming XML data 32 to Web engine 106. Further details of Metadata Builder 102 are shown in FIG. 7. At the core of the Metadata Builder is a Metadata Builder Engine 114, which includes a parser 116, and an extractor 118. Additional components include an XML builder 120 and a style sheet builder 122. In one embodiment, Metadata Builder 102 may be implemented as a business service that is managed by object manager 56.

Figure 8:
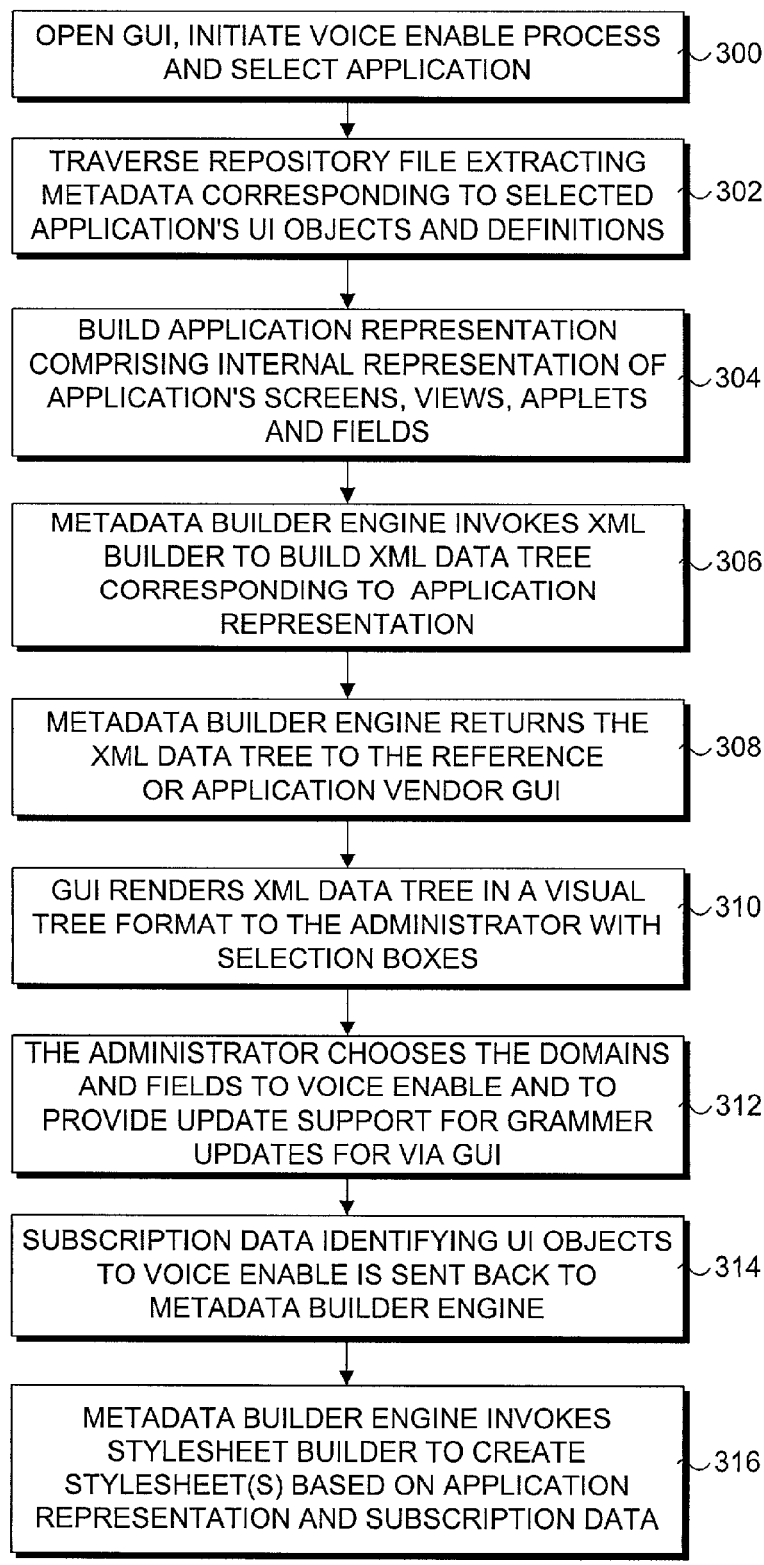
FIG. 8 is a flowchart illustrating the operations and logic used by one embodiment of the invention when enabling an administrator to specify which user interface (UI) objects to voice enable and/or provide grammar update support for and the generation of an application representation to be used for building style sheets in accordance with the invention.

With reference to FIG. 8, the process for selecting which UI objects to voice enable and for generating style sheets begins in a block 300 in which the application vender user (e.g., an administrator) opens reference or application vendor GUI 108, initiates the voice enable process, and selects an application the administrator would like to provide voice access to. Generally, the administrator will be presented with a user interface such as a dialog box or web page (both not shown) that enables the user to select an application to voice enable from among one or more applications that are supported by the enterprise data system.

Upon selection of the application, selection data 123 identifying the selected application is passed to metadata builder engine 114, which then invokes extractor 118 to traverse repository file 68 and extract metadata corresponding to the selected application's UI objects and definitions in a block 302. As described above, the repository file contains object definitions for the various objects corresponding to all of the applications in the enterprise data system, stored as metadata in a compiled format. Included in these object definitions are user interface object definitions and their relationships. An exemplary portion of a repository file is shown in FIG. 9. (It is noted that in one embodiment the repository file is actually stored in a compiled format rather than the ASCII text format shown in FIG. 9, which is used in the figure for clarity.)

Figure 10:
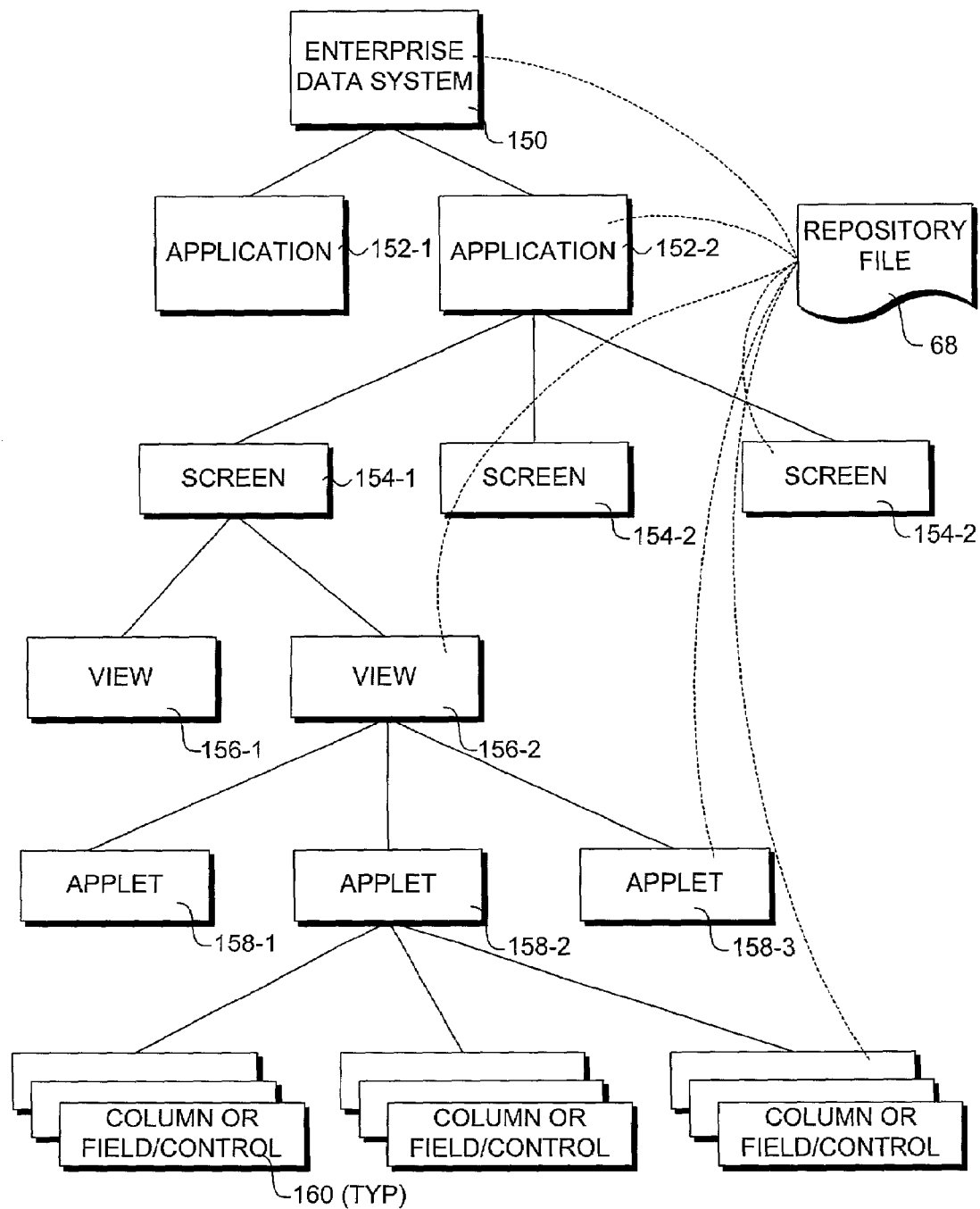
FIG. 10 is a block diagram illustrating the user interface hierarchy of a user interface to enable access to the enterprise data system in accordance with one embodiment of the invention.

In one embodiment, the user interface objects have a hierarchical relationship, as shown in FIG. 10, wherein the top level of the hierarchy corresponds to the entire enterprise data system, as depicted by an enterprise data system block 150. Each enterprise data system will include one or more applications 152, with each application 152 including a plurality of screen 154. In turn, each screen will include one or more views 156, with each view including one or more applets 158. Finally, each applet will include a plurality of columns and/or fields/controls 160, with each column corresponding to column in a list applet each field/control typically comprising an edit control on a detail form (i.e., entry) applet that is either mapped to a column in a database table or a list of values that are either predefined, or generated at run-time based on current data in the enterprise data system.

Figure 11:
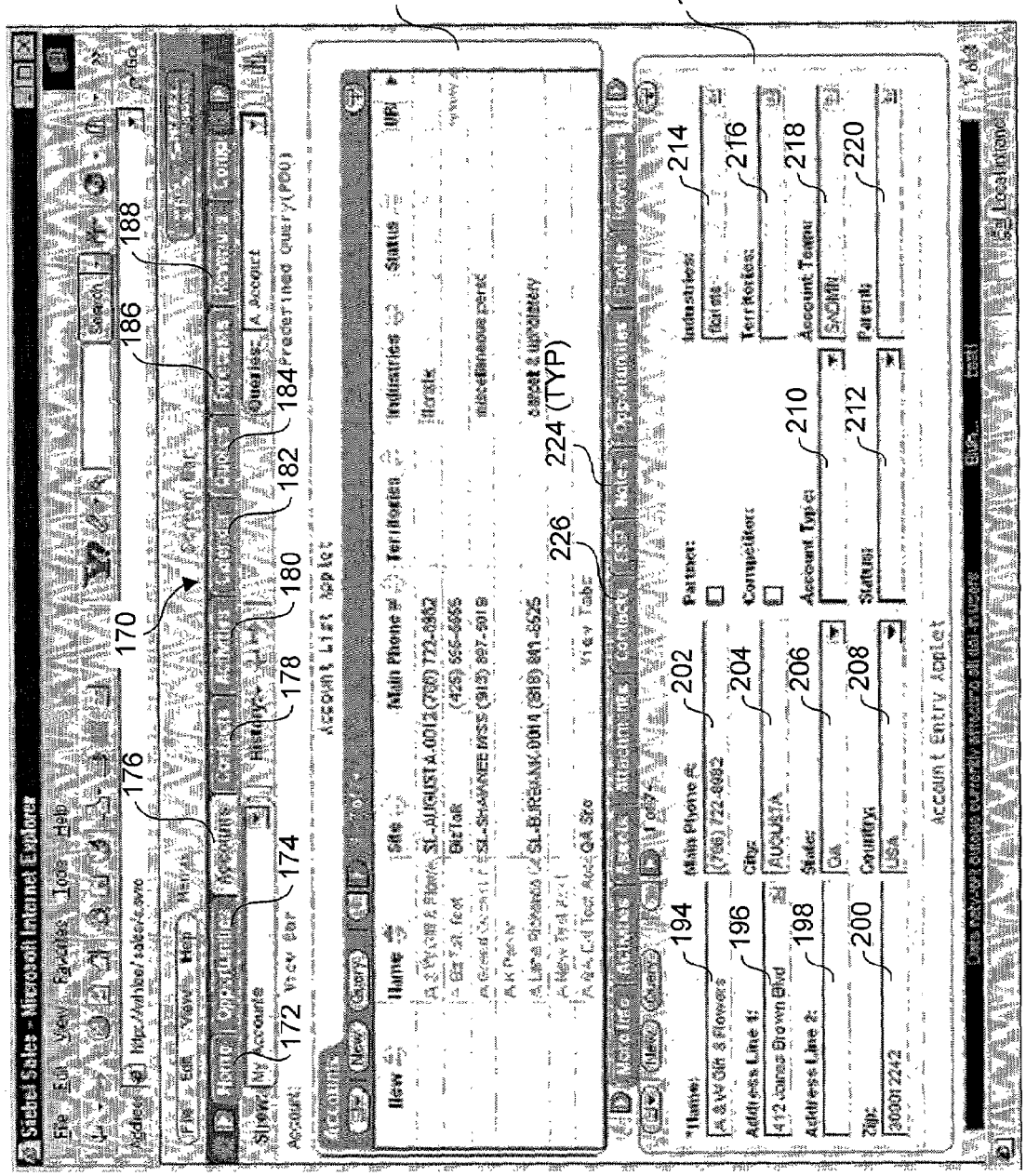
FIG. 11 is a representation of an exemplary user interface corresponding to an Sales Accounts view.

A rendered user interface 170 that graphically depicts the UI object hierarchy of FIG. 10 is shown in FIG. 11. User interface 170 includes a screen bar 171 corresponding to screens 154 that enables a user to select a screen the user desires to view. For example, in the illustrated user interface these screens include a "Home" screen 172, an "Opportunities" screen 174, and "Accounts" screen 176, a "Contacts" screen 178, an "Activities" Screen 180, a "Calendar" screen 182, a "Quotes" screen 184, a "Forecasts" screen 186, and a "Revenues" Screen 188. Activation of the tab having the screen name causes the application to render the selected screen and navigate the user to the application "domain" corresponding to the selected screen.

As discussed above, each screen includes one or more applets. Under common user interface terminology, applets would generally fall into the form category. Applets generally have two formats: list applets and form applets. A list applet contains a tabular list of data including multiple rows and data columns similar to that shown in an Account list applet 190. A form applet typically includes a plurality of fields containing data pertaining to a particular "record," wherein the record will often correspond to a selected row in an accompanying list applet. Form applets are also referred to as detail applets and entry applets. For example, an Account entry applet 192 includes a "Name" field 194, and "Address Line 1" field 196, and "Address Line 2" field 198, a "Zip" field 200, a "Main Phone #" field 202, a "City" field 204, a "State" field 206, a "County" field 208, an "Account Type" filed 210, a "Status" filed 212, an "Industries" field 214, a "Territories" field 216, and "Account Team" field 218 and a "Parent" field 220. Generally, each field will have a corresponding edit control, which typically will comprise an edit box or a dropdown control from which a user may select from a predetermined list of values. In some instances, a dialog picklist control 222 may also be provided that enables a user to select from list of options via a dialog box that is populated with the list using a run-time query.

In many instances, applets may be linked via a parent-child type relationship. For example, Account list applet 190 is a parent of Account entry applet 192, which includes a plurality of tabs 224 to enable a user to enter or view information specific to the name on each tab and the currently selected account record. For example, the currently selected account is "A & W Gifts and Flowers," and a user could enter information concerning contacts for this account by activating a "Contacts" tab 226, which would bring up a Contacts form including a plurality of fields pertaining to contact information (not shown).

Returning to the flowchart of FIG. 8, in a block 304 parser 116 builds an application representation 124 comprising an internal representation of the selected application's screens, views, applets, columns, and fields/controls based on the corresponding user interface object definition metadata that was extracted in block 302, as depicted by application representation 124. In one embodiment, the application representation comprises a hierarchical tree structure of the object definitions extracted by the extractor. In exemplary application representation occupies the left-hand portion of FIG. 12. Each node in the hierarchical tree stores data corresponding to an application representation object. The object may be an application object, screen object, view object, applet object, etc. After getting the object definition from the extractor, the parser will convert the object to an application representation object and store it in a node of the hierarchical tree structure. This is repeated for all objects until the tree is filled.

Next, in a block 306 metadata builder engine 114 invokes XML builder 120 to build an XML data tree 126 corresponding to application representation 124, and returns the XML data tree to reference or application vendor GUI 108 in a block 308. To perform this operation, the XML builder traverses the hierarchical tree and builds an XML representation for it. The reference or application vendor GUI parses the XML data tree and renders a selection tree 130 in a window or frame similar to that shown in FIG. 13. In general, the selection tree will have a hierarchy similar to the user interface hierarchy of the application, as defined by application representation 124.

In one embodiment, the reference GUI comprises a plurality of ASP (Active Server Page) web pages that use an ActiveX data control to get access to the voice metadata builder. In this embodiment, the ASP creates the ActiveX control, gains access to the voice metadata builder, starts the XML extraction to get the XML object definition, renders the HTML for the reference GUI, returns subscription XML data for UI components to voice enable and/or provide voice update support for, triggers the creation of style sheets, and allows loading and saving existing subscriptions. In one embodiment, the ActiveX DataControl is used to create selection tree 130, wherein the ActiveX DataControl enables the window to have functionality similar to the Microsoft Windows Explorer file management tool. For example, objects corresponding to screens, views and applets are displayed with adjacent file icons, including open file icons 132 and closed file icons 134, while column and field/control objects are displayed with adjacent document icons 136. Additionally, activation of an expansion control 138 causes data pertaining to a closed folder to be expanded, while activating a collapse control 140 causes data corresponding to an opened folder to be collapsed (i.e., removed from view).

Figure 13:
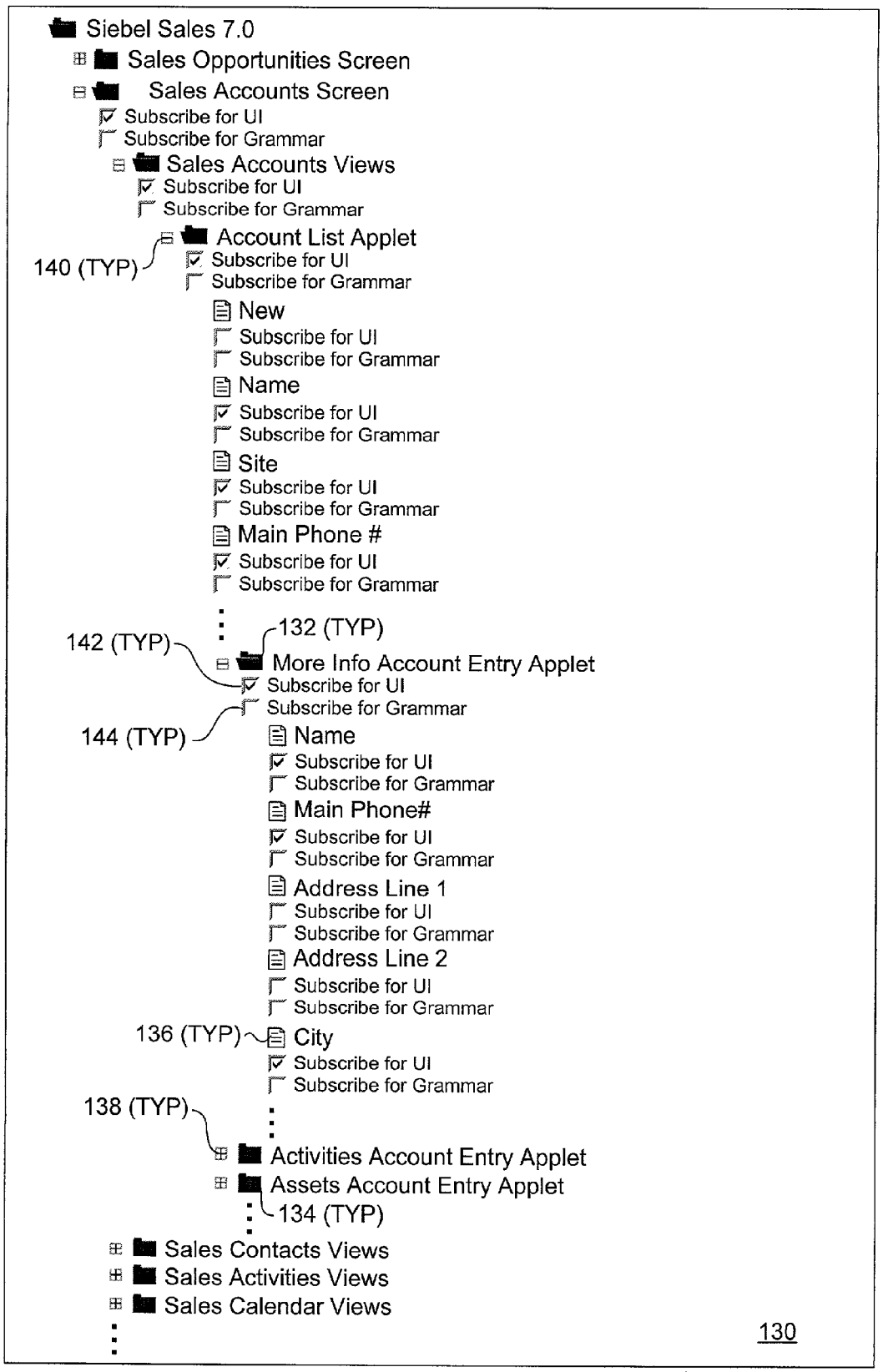

As shown in FIG. 13, a "Subscribe for UI" checkbox 142 and a "Subscribe for Grammar" checkbox 144 is displayed below each opened screen, view, applet, and column/field/control object. Accordingly, in a block 312, the administrator selects appropriate checkboxes to identify which views, applets, and columns/fields/controls the administrator would like to subscribe to have voice enabled and/or provide grammar update support for. Subscription data 146 pertaining to the selected UI objects and checked options are then submitted back to metadata builder engine 114 in a block 314 along with a request to voice enable and/or provide grammar update support for the selected UI objects. An exemplary set of subscription data is shown in the right-hand portion of FIG. 12. Finally, in a block 316, the metadata builder engine invokes style sheet builder 122 to create style sheets 148 based on the application representation and the subscription data.

Figure 14A:
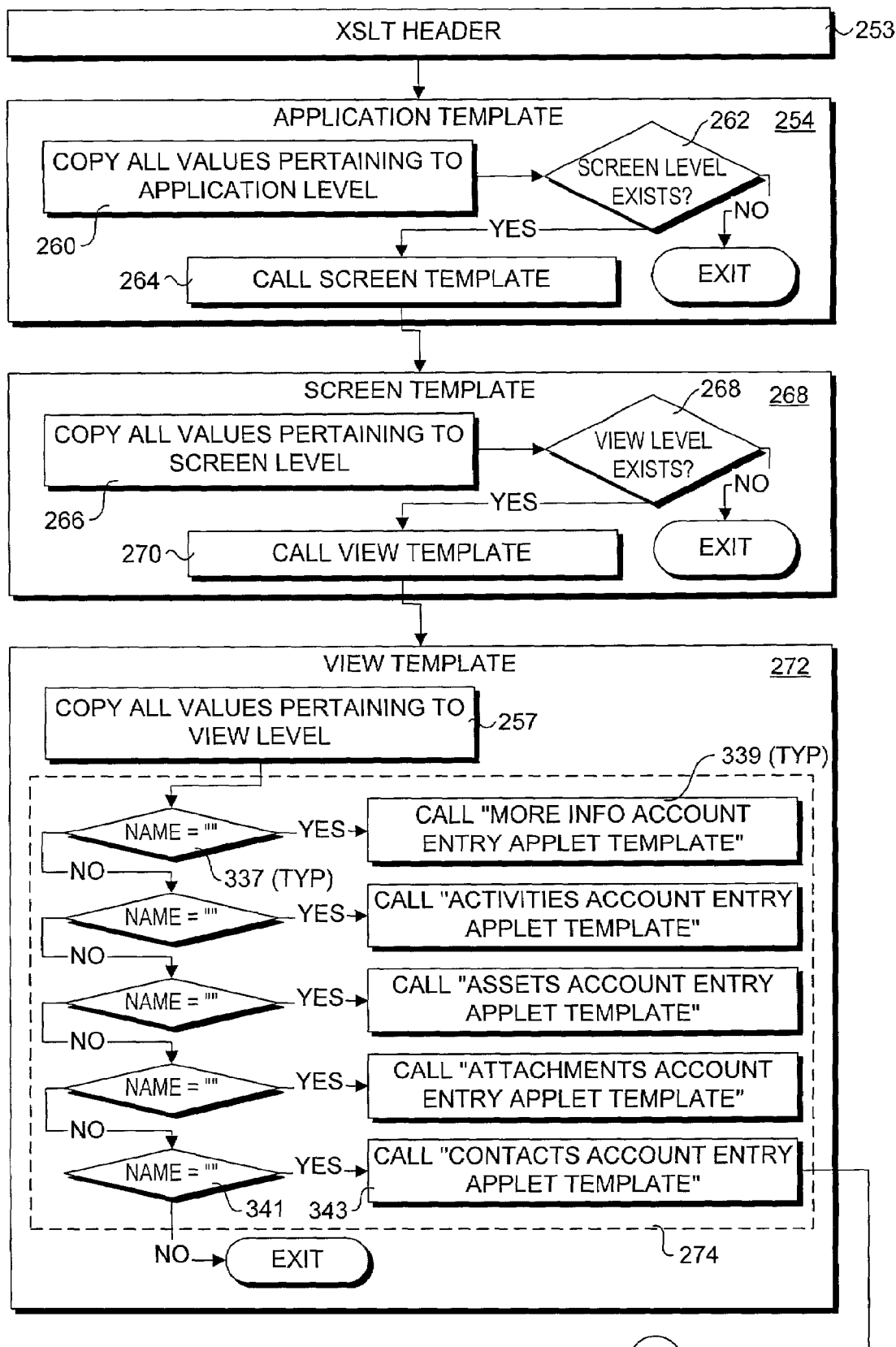
FIG. 14A–C collectively comprise a combination of a style sheet layout definition and integrated flowchart corresponding to an exemplary style sheet that is used to filter out data that does not pertain to voice-enabled fields.
Figure 14B:
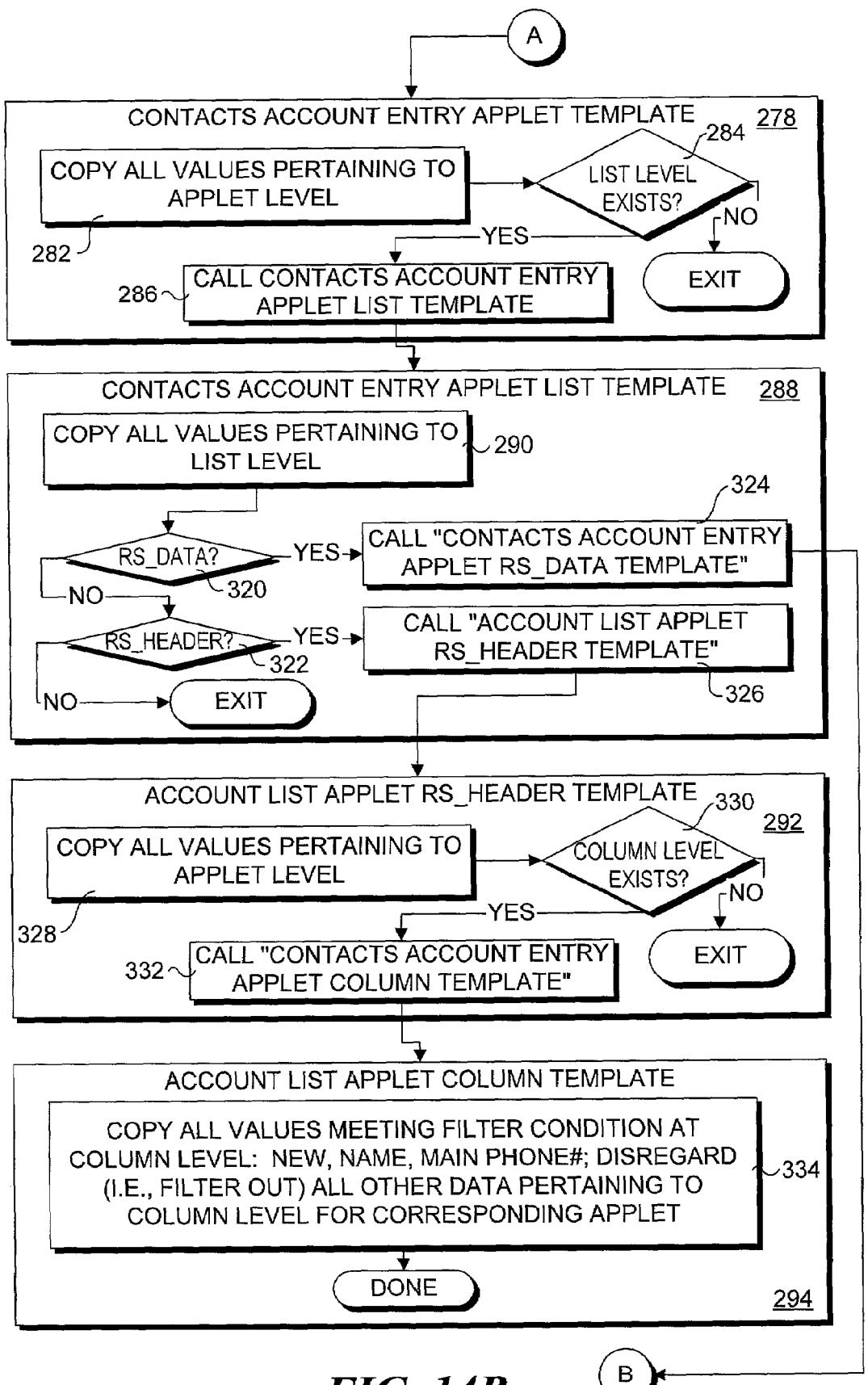
Figure 14C:
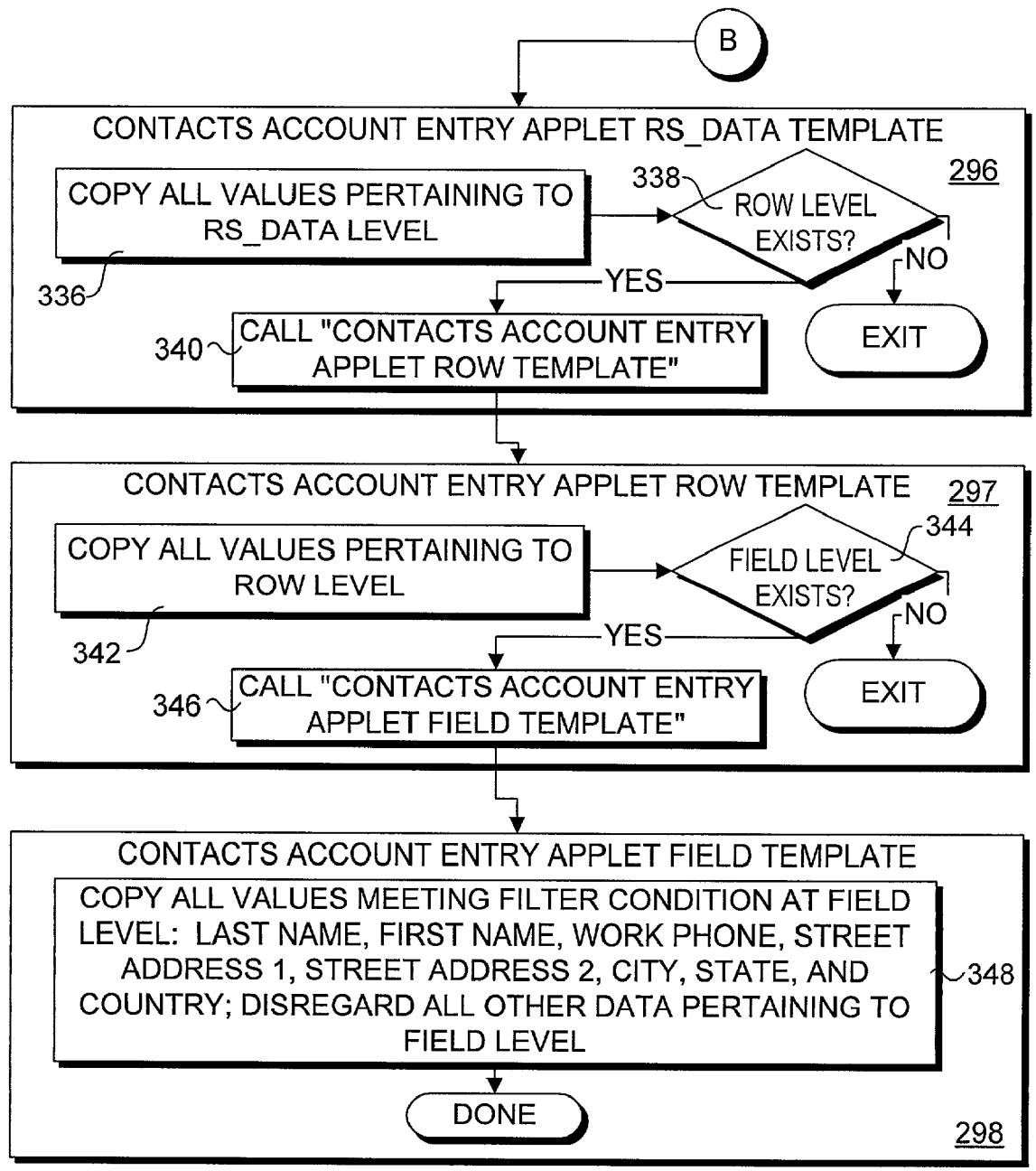

Based on the UI objects selected to be voice-enabled, the style sheet builder will generate an XSLT (extensible Style sheet Language Transformation) style sheet, which will filter the unselected elements from the original XML data in a result set returned by the enterprise data system such that only data pertaining to voice-enabled UI objects are returned to voice application 14A. An exemplary style sheet layout and logic contained when each style sheet template is shown in FIGS. 14A–C. As the name implies, XSLT is an XML-based language used to create style sheets that are used to transform XML documents into other types of documents and to format the output of XML documents. XSLT became a W3C Recommendation in November, 1999; the specification can be found at http://www.w3.org/TR.xslt.

XSLT style sheets are built on structures called templates. A template specifies what to look for in an input document, called the source tree, and what to put into an output document, called the result tree. XSLT style sheets are also composed of XSLT elements, which generally include the <xls:style sheet>, <xls:template>, <xsl:value-of:>, <xls:output>, <xls:element>, <xls:attribute>, <xls:attribute-set>and <xsl:text>elements. The XSLT elements also include conditional elements, such as <xsl:if>, <xsl:choose>, elements and loop elements such as the <xsl:for-each>element. All of these elements will be familiar to those skilled in the XSLT style sheet art.

Initially, each style sheet will include a set of templates corresponding to respective UI object hierarchy positions, including an application processing template, a screen processing template, a view processing template, an applet processing template, and a LIST template. If the applet is a list applet, the set of templates will further include an RS_HEADER template and a COLUMN template; if the applet is an entry applet (i.e., multi-field form), the set of templates will include an RS_DATA template, a ROW template and a FIELD template. The purpose of each template is to filter out unwanted data at each hierarchy level of the XML source tree document, as will be explained below in further detail.

With reference to the flowchart of FIG. 15 in view of the XSLT style sheet layout of FIGS. 14A–C, the generation of XSLT style sheets proceeds as follows. The process begins in a block 400 in which the style sheet is initialized. In accordance with one embodiment of the invention, each XSLT style sheet will include substantially the same layout and logic at the beginning of the style sheet. This will include an XSLT header section 253, and application template 254, and a screen template 256. The application template will include a code block 260 that copies all of the values in the source tree document at the application level to the result tree document, and a decision block 262 in which a determination is made to whether a screen level exists in the source tree document. If it does, screen template 256 is called in a block 264. If the screen level doesn't exist in the source tree document, the process exits.

The code blocks in the screen template are substantially similar to those in the application template. First, style sheet code corresponding to a block 266 is used to copy all of the values at the screen level of the hierarchy to the result tree document. In a decision block 268, a determination is made to whether a view level exists in the source tree. If it does, view template 258 is called in a block 270. If it does not, the process exits.

Figure 15:
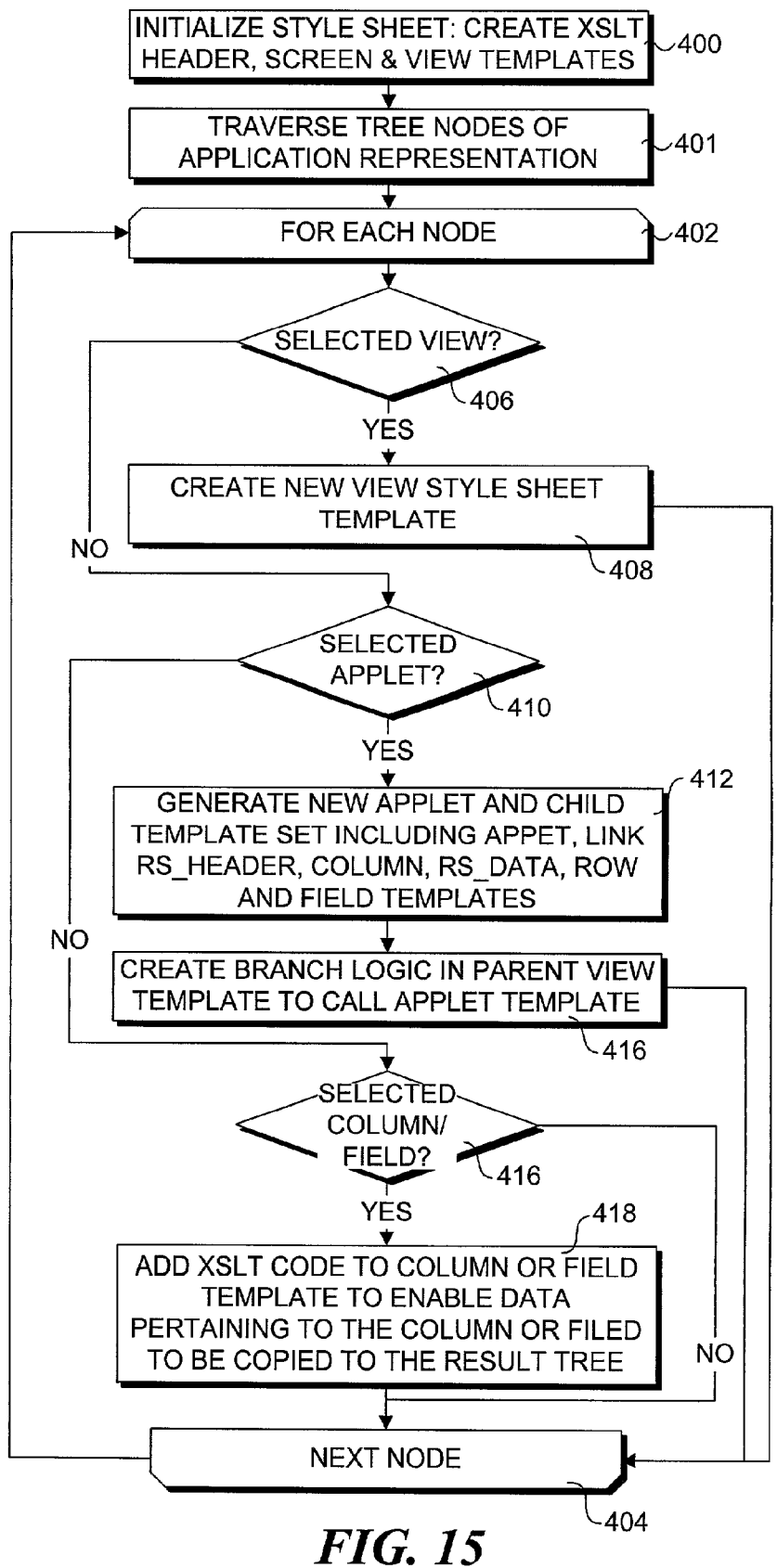
FIG. 15 is a flowchart illustrating the operations and logic implemented by one embodiment of the invention when generating a style sheet.

In a block 401 of FIG. 15 the tree nodes of the application representation are traversed, beginning with the root of the tree (i.e., the application level—note the application representation tree will look somewhat like an upside-down real tree, so the root is at the top of the application representation in FIG. 12). As depicted by start and end blocks 402 and 404, the operations enclosed between these two loop end points are performed on each node as the application representation tree is traversed.

In accordance with one embodiment of the invention, a style sheet is created for each view. Accordingly, in a decision block 406, a determination is made to whether the node corresponds to a selected view (i.e., a view that is selected to be voice-enabled via the subscription data). For example, supposed that the current node being processed corresponds to a Sales Accounts View 250 node in the application representation of FIG. 12. Since the corresponding subscription data indicates that this is a view that is selected to be voice-enabled, the answer to the decision block is YES (TRUE), and the logic proceeds to a block 408 in which a new style sheet is created using a base view style sheet template. This new view template will have a layout similar to a view template 272 shown in FIG. 14A, will include a code block 257 containing logic that is used to copy all values pertaining to the view level to the result tree, and an applet template routing section 274 that is used to route the XSLT processing to an appropriate template as identified in the source tree. (It is noted that applet template routing section 274 will initially be empty, as explained in further detail below.) The logic then loops back to start loop block 402 to begin processing the next node.

If the answer to decision block 406 is NO (FALSE), the logic proceeds to a decision block 410 in which a determination is made to whether the node corresponds to a selected applet. For example, suppose that the current node is a More Info Account Entry Applet node 276 in the application representation. This node is marked as being selected to be voice-enabled, resulting in a YES result to decision block 410 and leading to a block 412 in which a new applet and child template set is generated, including an applet template, and a list template. Each applet template will include substantially the same logic that includes specific references pertaining to that applet template. In one embodiment each template has a name that specifically references the node corresponding to the template. For example, a Contacts Accounts Entry Applet Template 278 corresponding to a Contacts Accounts Entry node 280 is shown in FIG. 14B. This template includes a code block 282 containing logic to copy all of the values pertaining to the Contacts Accounts Entry Applet in the source tree to the target tree. The template further includes a code section pertaining to a decision block 284 through which a determination can be made to whether the source tree document includes a list level. The template also includes a code block 286 that contains logic to call an appropriate list template (in this case a Contacts Account Entry Applet List template 288). (It is noted that for simplicity Contacts Account Entry Applet List template 288 is used in conjunction with both the Accounts List applet and the Contact Account Entry Applet. It will be understood that in actual practice a separate List template would be provided for each applet.)

Each List template will include a code block 290 containing logic to copy all values pertaining to the list level of the source tree document. As discussed above, if an applet is a list applet, an RS_Header and a column template are added, as depicted by an Account List Applet RS_HEADER template 292 and an Accounts LIST Applet Column template 294. In contrast, if the applet is an entry applet than an RS_DATA template, row template, and field template are created, as depicted by a Contacts Account Entry Applet RS_DATA template 296, a Contacts Account Entry Applet ROW template 297, and a Contacts Account Entry Applet Field Template 298. Accordingly, each list template will include a code section corresponding to a decision block 320 by which a determination is made to whether and RS_DATA level exists in the source tree document, and/or a code section corresponding to a decision block 322 by which a determination can be made to whether an RS_HEADER level exists in the source tree document. If the answer to decision block 320 is TRUE, the logic flows to a code block 324 in which an appropriate RS_DATA template is called. If the answer to decision block 322 is TRUE, the logic flows to a code block 326 in which an appropriate RS_HEADER template is called.

As depicted by Account List Applet RS_Header template 292, each RS_Header template includes a code block 328 containing logic to copy all of the values pertaining to the applet level from the source tree to the result tree. A code section pertaining to a decision block 330 is also provided that is used to determine whether an appropriate column template exists in the source tree document. If it does, the logic proceeds to a code block 332 in which the appropriate column template is called.

As depicted by Account List Applet Column template 294, each column template will include a code block 334 that includes logic to filter out all data at the column level that does not pertain to columns that were marked to be voice enabled for the applet that is being currently processed. For example, in code block 334, logic is included to filter out data in all columns of the Account List Applet except for a new column, a Name column, and a Main Phone# column. When a Column template is initially generated, the filtering logic corresponding to code block 334 will be empty.

As depicted by Contacts Account Entry Applet RS_DATA template 296, each RS_DATA template includes a code block 336 that contains logic to copy all of the values pertaining to the RS_DATA level in the source tree. Each RS_DATA template also includes a code section corresponding to a decision block 338 by which a determination is made to whether a Row level exists in the source tree. Each RS_DATA template further includes a code block 340 that is used to call an appropriate Row template corresponding to the Row level.

Each Row template includes a code block 342 containing logic to copy all values pertaining to the Row level of the source tree, as depicted in Contacts Account Entry Applet Row template 297. Each Row template also includes a code section corresponding to a decision block 344 by which a determination is made to whether a Field level exists in the source tree. Each Row template further includes a code block 346 that is used to call an appropriate Field template corresponding to the Row level.

In a manner similar to the column template discussed above, each field template includes a code block 348 containing logic to filter out all data at the field level that does not pertain to fields that were marked to be voice enabled for the applet that is being currently processed. For example, in code block 348, logic is included to filter out data in all fields of the Contacts Account Entry Applet except for a Last Name column, a First Name column, a Work Phone column, a Street Address 1 column, a Street Address 2 column, a City column, a State column, and a Country column. When a Column template is initially generated, the logic corresponding to code block 348 will be empty.

Returning to the flowchart of FIG. 15, the next operation is performed in a block 414, wherein branch logic is created in the "parent" view template for the current applet. Generally, this branch logic will be contained within an applet template routing section 274 and comprise a choose block containing a list of test conditions. Each of these test conditions is depicted in view template 272 as a decision block 337 and a call block 339. For example, the test conditions in applet template routing section 274 pertain to applet nodes 276, 279, 281, 283, and 280 in the application representation of FIG. 12. Generally, if a test condition is determined to be TRUE, the applet template corresponding to the test condition is called.

Upon completion of block 414, the logic loops back to process the next node, which would be a name column/field node 285. This node would be processed in the manner discussed below, along with all of the other field nodes of the More Info Account Entry applet. The processing would then address Activities Account Entry applet node 279 (and subsequently its field nodes), followed by Assets Account Entry applet node 281 (and subsequently its field nodes) followed by an Attachments Account Entry applet node 282 (and subsequently its field nodes). As discussed above, an appropriate set of applet and child templates would be created for each applet node in block 412, and an appropriate portion of template branch logic will be added to the parent view template for these applets.

Now suppose that a Contacts Account Entry applet node 284 is encountered. After processing this node, the next node to be encountered is a Personal Title column/field node 287. In this instance, the answers to both decision block 406 and 410 would be NO, and the logic would proceed to a decision block 416 in which a determination is made whether the node corresponds to a selected column or field. Since the Personal Title field node is marked as not selected, the answer to decision block 416 is NO, and the logic loops back to process the next node, which is a Last Name field node 289. This time, when the logic reaches decision block 416 the result is YES (since this UI object was selected to be voice-enabled), and the logic proceeds to a block 418. In this block, XSLT code is added to the column and/or field template child of the current applet (as applicable) to enable data corresponding to the column or field to be filtered through. For example, this logic might be similar to that shown in code block 334 for a Column template, or that shown in code block 348 for a Field template.

In one embodiment, addition filter conditions are concatenated onto a first filter condition for other column or field objects corresponding to the current applet upon subsequent processing of the applets child column and field nodes as those nodes are encountered. For example, in the application representation of FIG. 12, each of the Last Name, First Name, Phone #, Street Address 1, Street Address 2, State City and Country fields have been selected to be voice-enabled. As a result, appropriate filter logic would be added to allow data pertaining to these fields to be filtered through at the Field level.

The operations and logic described above for the flowchart of FIG. 15 are further repeated until all of the nodes in the application representation have been processed. The net result is that in accordance with one embodiment of the invention there will be a separate style sheet created for each view, and each view will include child templates corresponding to one or more applets that are contained within that view. The style sheet builder is also used to build style sheets for the voice update support component 104, as described below.

Exemplary Enterprise Data System

In one embodiment, enterprise data system 16 comprises a Siebel® 7 enterprise data system and Web engine 106 comprises a Siebel® Web Engine (SWE). Under the Siebel® 7 architecture, the SWE provides an XML interface to enable third party applications to access a Siebel® enterprise data system. Siebel® 7 supports open system architecture through XML pages that are generated by the Siebel® Web Engine as applications can make a request through a webserver, Java Data Bean or ActiveX Data Control.

In order to support different implementations of voice application that vendors develop, the XML interface generates the definition of user interfaces and user data in XML format, which will then be sent to the vendor's voice application. The voice application will use this information to format its voice page and present that page to its voice users via internal operations such as TTS. In response to verbal navigation commands and data request, the voice application will then format a next request based on a current user navigation context and submit it via an appropriately configured XML document back to the Siebel® Web Engine. Throughout the remainder of this specification, SWE XML interface access examples will be provided using an HTTP request format. It is important to note that similar access features are also available through an equivalent COM or JDB (Java data bean).

XML Page Content

The XML page output is based on the application definitions, including application, screen, view, applet, and columns/fields/controls, that are defined in a repository. In accordance with the Siebel® enterprise data system architecture, administrators are enabled to customize their enterprise data system implementations to fit their needs such that each implementation will be unique, and customer can change. The XML interface defines XML tags in the XML pages to support various types of user interfaces that are presented to different type of users, including HTML and WML dat.

Generally, each XML output page 34 that is sent back to voice application 14A contains the following sections:

1. The Supported Version of XML and Encoding Information

This information is appended in all XML pages.

2. Application Information

This information is appended in all XML pages. It describes the application name, such as Siebel® Sales Enterprise, that the voice application is connected to and interacting with.

3. User Agent Markup

This information is appended to all XML pages. It describes the default markup language that is supported and is based on user-agent in the http header request header.

4. Active Screen, View and Applets Definition and User Data

This information is generated by default. If application only wants this information, it can add SWEDataOnly=TRUE in the http request. This section contains current active screen and view information and also applets and the record (user data) information defined in that view.

XML User Data

This section gives a detailed description of the outbound XML tags contained in an XML page 34 that is returned to voice application 14A in response to a request for user data (e.g., via a user operating phone 18). To retrieve data, voice application 14A sends a request having a format described below to Web engine 106. The request contains UI object specific information, such as screen, view, and applet identifiers, and specifies as style sheet to use when filtering the returned dataset. The request may also include additional parameters that are specific to the Siebel® Web Engine. A table listing some of these parameters and the effect of such parameters is contained in the attached appendix. For example, if the voice application only wants data returned without UI information, the user can specify that the SWEDataOnly parameter is set to TRUE in the request. When this parameter is set, the returned XML contains only data tags and does not contain any UI Navigation elements like menu drop downs, page tabs etc. In contrast, if the SWEDataOnly is not set to TRUE (default value), then in addition to the data, the user data returned includes data pertaining to the screen, applet and view the data resides in. For instance, the user data for the Contacts screen would have information pertaining to the SCREEN, VIEW, and APPLET the data is retrieved from in addition to the actual user contact data.

The sample XML provided herein represents XML data for the Contacts Screen. An HTTP request made to Web engine 106 SWE to retrieve data pertaining to the Contacts screen may have the following format:

http://localhost/sales/start.swe?
SWECmd=GotoPageTab&SWEScreen=Contacts+
Screen&SWEGetDataOnly=TRUE

LISTING 1

The http://localhost/sales/start.swe? Parameter specifies the Internet URL address for the Web engine. The parameters in the second line correspond to specific commands that instruct the Web engine what data is desired based on a navigation context within the application—in this case the contacts screen. As discussed above, the last parameter specifies that only data pertaining to appropriate UI objects are to be returned.

In general, a typical XML page that is returned by the Web engine in response to a data request will have a format shown in FIG. 16 (when the SWEDataOnly=TRUE argument is used). As will be recognized by those skilled in the XML art, the XML page includes nested pairs of XML tags that are used to define a format for the returned data. Each pair of tags defines a level in the hierarchy of the XML tree. Detailed examples of various portions of the XML page are shown in FIGS. 17, 18, and 19.

With reference to FIG. 17, the first element in the XML page will be an application element 350 that identifies the name of the application. The next element comprises a user agent element 351 that provides information about the user agent or the browser type that made the XML or HTML request. A screen element 352 appears next, which is contained inside of the application element tag pairs. This element gives information about the name and title for the currently active screen.

The next element is a view element 354. Similar to the screen element, the view element describes the name and title of the currently active view. An applet element 356 is contained inside the view. In addition to returning an applet name 358 and applet title 359, the applet element includes a MODE attribute 360, a NO_INSERT attribute 362, NO_MERGE attribute 364, a NO_DELETE attribute 366, a NO_UPDATE attribute 368, a NO_EXEC_QUERY 370. The MODE attribute describes what mode the applet is in. It can either be in an EDIT mode or BASE mode. The former means that the applet allows modification, deletion, creation and querying of records. The latter means that the applet is read only and cannot be modified.

The NO_INSERT, NO_MERGE, NO_DELETE, NO_UPDATE, NO_EXEC_QUERY attributes provide a filter to what specific edit mode operations are possible for the applet. If any of these attributes are TRUE then that particular operation is not possible. For instance, if the NO_INSERT attribute is TRUE then new records cannot be inserted onto this applet. The voice application can tailor the voice commands based on these attributes. For instance, if the NO_EXEC_QUERY attribute is set to FALSE for an applet, this indicates that the Voice application should be able to query for a contact using that applet.

Another attribute included in the applet element is a CLASS attribute 372. This attribute specifies the C++ class the applet belongs to. For instance, in the illustrated example the CLASS attribute has a value of CSSFrameListBase, which identifies it as a List applet under the Siebel® 7.0 architecture.

A ROW_COUNTER attribute 374 provides an indication of the number of data records returned. A "+" at the end of the attribute value indicates that there are more records than that returned by the current XML page. One of the ways to get all the data would be to check for the ROW_COUNTER attribute and see if it contains a "+". If it does, then submit the prior data request to the Web engine repeatedly until the ROW_COUNTER attribute no longer ends with a "+".

It is possible to retrieve a large number of rows via a single request by setting the SWESetRowCnt parameter in the HTTP request. Caution should be used when setting this parameters, as a large value may generate a delayed response since data pertaining to the number of rows provided by the parameter must be retrieved, converted into an XML format, and appended to the XML page.

In addition the HTTP route, XML pages that return only data may also be retreived via the Siebel® Data Bean and ActiveX Controls via calls to methods provided by the underlying business components (i.e., the business components corresponding to object manager 54). This way, specific columns can be activated directly, thus limiting the returns to specified data.

RS Header, Column

The next XML element of importance is the RS_HEADER element 376. As shown in further detail in FIG. 18, this element contains one or more COLUMN elements 378 that provide column details for the underlying data records. Each column element includes a NAME attribute 379, and a DISPLAY_NAME attribute 380, that respectively provide information about the name and display name of the column on the list applet. A DATATYPE attribute 381 describes what kind of data type the column represents. If the DATATYPE corresponds to a text type of data, a TEXT_LENGTH attribute 382 may be provided. For instance, a phone number might have a data type of "phone" and an email might have a data type of "email" or "character."

A REQUIRED attribute 383 defines whether the column is a required column or not. This information is useful when creating new records. The voice application can determine what field information is mandatory by looking at this attribute. A FORMAT attribute 384 is an important attribute that the voice application can use to determine the format of the data. For the Date data type this attribute will contain the acceptable Date Format (e.g., as shown in the middle column element of FIG. 18). For revenue and other price related fields this attribute will have the format for the dollar amount. The voice application can use this to get or display the right information back to the user.

A CALCULATED attribute 385 specifies that the column is not a database column but rather contains a value that is calculated using a mathematical expressions or similar calculation. A FIELD attribute 386 provides the name of the FIELD element the column refers to. The FIELD element (described below) contains the actual data. Typically, voice application 14A might make use of both the FIELD and COLUMN elements to get more information on the data. A READ_ONLY attribute 387 specifies whether the column is editable or just read only.

RS Data, Row, Field

The next important XML element is an RS_DATA element 391. This element contains the XML tags that hold the actual data. An example of an RS_DATA element is shown in FIG. 19.

A ROW element 392 identifies the Row id of the data in the attribute ROW_ID. This information is very useful in querying for a particular row of data and getting the detailed information for that row. For instance, if the voice application wanted a particular row, e.g. 12-WFJ4D, on the Contacts Screen, the XML request would look something like the following:

attribute in the COLUMN element (under the RS_HEADER section) and then get the data from the FIELD element. The FIELD attribute of the COLUMN element gives a link to the FIELD element, which holds the actual data. It is recommended not to use the field attributes in the RS_DATA section for data type detection, as this information is not guaranteed to be a constant. This might change if the object definition, field names in this case, are changed.

Voice Access Process Using the Mobile Connector

Figure 20:
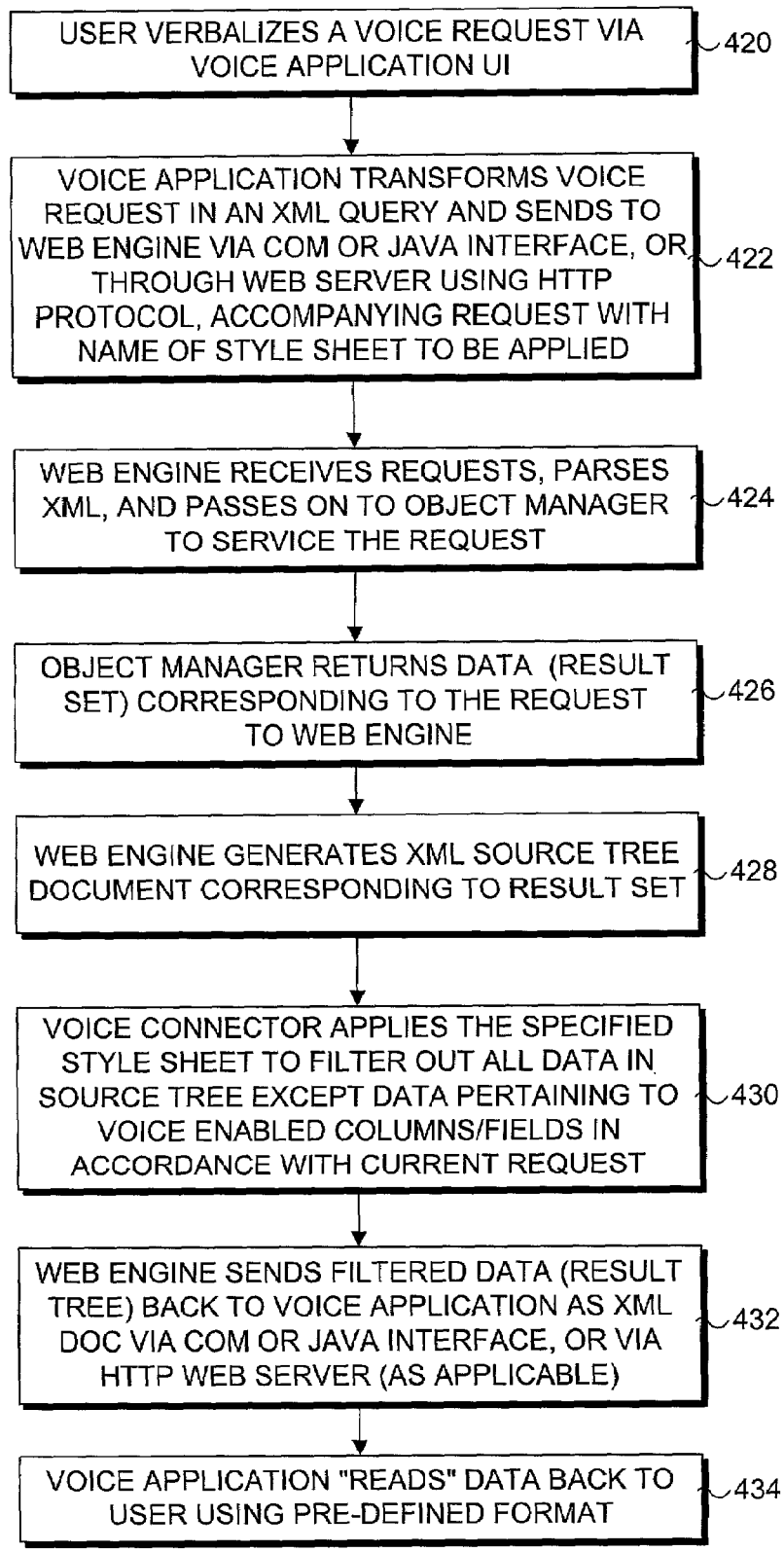
FIG. 20 is a flowchart illustrating the operations and logic used by one embodiment of the invention when processing a voice request for data.

With reference to the flowchart of FIG. 20, a voice data access process in accordance with the software and hardware architectures for the systems described herein begins in a block 420 in which a user verbalizes a voice request via a voice application user interface. Generally, the voice application user interface operations are enabled in large part via voice infrastructure 20 and is therefore outside the scope of the invention, as discussed above; the operations of block 420 and a block 434 discussed below are included in the flowchart to illustrate how a complete voice access would be performed.

In a block 422, the voice application transforms the voice request into an XML query (i.e., data request) and sends the query as an XML document 32 to Web engine 106 via either the Siebel® COM or Java interface, or through Web server 112 using HTTP. For example, suppose the user desires to retrieve information pertaining to a particular contact from within the Contacts Accounts Entry Applet having a last name of "Jones," and the applicable style sheet is named "Sales_Accounts_stylesheet" Using HTTP, the XML query would look something like the following:

```
http://localhost/sales/start.swe?
SWECmd=InvokeMethod&SWEMethod=DrillDown&SWEView=Visible+Contact+List+View&SW
ESetMarkup=XML&SWEApplet=Contact+List+Applet&SWERowId=12-
WFJ4D&SWEField=Last+Name
```

LISTING 2

A SELECTED attribute 393 indicates that the particular row is selected on the User Interface. FIELD elements 394

```
http://localhost/applicationname/start.swe?
SWECmd=GotoView&SWEView=Sales+Accounts&SWESetMarkup=XML&SWEApplet=Contacts
+Accounts+Entry+Applet&SWEDataOnly=TRUE&SWEXslStyleSheet=Sales_Accounts_stylesheet
&Last+Name=Jones
```

LISTING 3 holds the actual data for the row. Each FIELD element includes a NAME attribute 395 that provides the name of the Business Component field corresponding to the element. This information is useful in determining what fields to query on while fetching a particular row id. In the URL of LISTING 2 the SWEField parameter is queried on the Last Name of the contact. Each FIELD element also includes a VARIABLE attribute 396 value that corresponds to the name of the column to which the field is mapped to.

Retrieving Detailed Information About the Data

As discussed above, the RS_HEADER section holds detailed information about each data column. For instance, if the voice application wants to detect if a particular column holds a phone number then it should lookup the DATATYPE In the foregoing example and other examples discussed above, the XML query comprises a concatenated list of Siebel® Web Engine commands, methods and arguments that informs the Siebel® Web Engine what data is wanted and how that data is to be provided back to the requester. In general, the Web engine needs to know a navigation context for the request data, such as the screen, view, applet, and columns or fields from which the data may be accessed. In addition to the navigation context data, the input XML document should also include the name of a style sheet that is to be applied to filter the returned data. In one embodiment, this is provided in a SWEXslStyleSheet argument. In accordance with one embodiment discussed above, a style sheet is created for each view in a given application. As a result, the style sheet corresponding to the view of the desired navigation context should be used to filter data in the output XML document.

Upon receiving the XML query, in a block 424 the Web engine parses the XML document to identify the navigation context corresponding to where the data may be accessed, along with any particular data location information, such as a rowed. This information is then passed on to the object manager to service the request. The object manager then formulates an appropriate SQL query, executes the SQL query against database 38, and returns data corresponding to the query's result set to the Web engine in a block 426. The Web engine the generates an XML document corresponding to the result set in a block 428 based, in part, on any applicable Siebel® Web Engine parameters that were provided in the incoming XMLwere provided in the incoming XML query. For example, if the SWEDataOnly argument is set to TRUE, the Web engine will filter out all of the UI content corresponding to the result set.

At this point the mobile connector applies the specified style sheet to the XML document to filter out all data except data pertaining to any voice-enabled columns or fields in accordance with the current request. For example, in response to the XML query in LIST 3, the Web engine would create an XML document containing all of the contact information for all contacts with a last name of "Jones."

At this point, the mobile connector then applies the identified style sheet to the XML document to filter out all the data that corresponds to columns and/or fields that were not selected to be voice-enabled for the current navigation context (i.e., current SCREEN, VIEW, and APPLET. Since the style sheet is an XSLT style sheet, one of several well-known prewritten software modules that implement an appropriate XSLT style sheet processing algorithm may be used.

As discussed above, the original XML document submitted to be transformed via the XSLT style sheet is the source tree, while the resulting transformed (i.e., filtered) document comprises the result tree. To produce the result tree, the algorithm traverses the XSLT style sheet based on conditional logic contained in the style sheet, copying data from the source tree to the result tree when a corresponding copy element is encountered.

For example, returning to the style sheet of FIGS. 14A–C, the algorithm would begin at XLST header 253 and continue sequentially through the various style sheet templates using appropriate branching conditions. The first style sheet template that is encountered is application template 254, which corresponds to the "APPLICATION" level of the source tree document. As discussed above, the XML document that is output from the Web engine after the style sheet is applied will have a format similar to that shown in FIG. 16. The source tree document will have a similar format. Accordingly, the "APPLICATION" level is identified by the <APPLICATION . . . > tag. In block 260 all of the values pertaining to the application level are copied to the result tree document. For example, data pertaining to the APPLICATION NAME will be copied to the result tree.

Next, in decision block 262 it is determined that a Screen level exists in the source tree, and screen template 268 is called in code block 264. This causes the processing to jump to screen template 268.

In a manner similar to Application template 258, in the Screen template all of values pertaining to the Screen level are copied to the result tree in block 266, and a determination is made in decision block 268 to whether a View level exists in the source tree. For source trees having a structure similar to that shown in FIG. 16, the answer to decision block 268 will be true, causing View template 272 to be called in block 270.

In View template 272, things get a little more interesting. Since the selected style sheet will correspond to the current view, all of the view information is copied to the result tree in block 257, such as the views name and title. The processing will then flow to applet template routing section 274, wherein the test conditions corresponding to decision blocks 337 are evaluated. In the current example, the applet is the Contacts Account Entry Applet, which has a corresponding test condition defined in a decision block 341. In response to a TRUE result for decision block 341, code pertaining to a block 343 will be executed, causing the processing to jump to Contacts Account Entry Applet template 278.

At the start of this template, all of the applet information is copied to the result tree in block 282, leading to decision block 284, which will determine that the source tree includes a List level. Contacts Account Entry Applet List Template 288 is then called in block 268. In the Contacts Account Entry Applet List Template, data pertaining to the list level (this will usually include just the <LIST> and </LIST> tags) is copied to the result tree, and an RS_DATA test condition corresponding to decision block 320 is encountered. If this condition is TRUE, which will be the case when field data is sought, the processing jumps to Contacts Account Entry Applet RS_Data template 296 via code block 324. In this template, all values pertaining to the RS_DATA level in the source tree is copied to the result tree in block 336, and then a determination is made in decision block 338 that a Row level exists in the source tree. Accordingly, Contacts Account Entry Applet Row template 297 is called in block 340, causing the style sheet processing to advance to the Contacts Account Entry Applet Row template.

In this template, all values pertaining to the Row level of the source tree are copied in block 342 to the result tree, and it is determined in decision block 344 that a Field level exists in the source tree. Accordingly, Contacts Account Entry Applet Field template 348 is called via block 346.

The Contacts Account Entry Applet Field template is different than the previous templates that were encountered. Rather than copy all of the data to the result tree, the logic in code block 348 says to copy data in the source tree pertaining to the "Last Name," "First Name," "Work Phone#," "Street Address 1," "Street Address 2," "City," "State," and "Country" fields to the result tree; the data in all of the other fields of the field templates parent applet will not be copied to the result tree, and thus will be filtered out.

Suppose that it was desired to retrieve data pertaining to the Account List Applet 275 in the application representation of FIG. 12. Since the Application, Screen, and View are the same for this applet as they were for More Info Account Entry applet 276, the processing would proceed in the same manner as discussed above until reaching Contacts Account Entry Applet List Template 288. In this instance, the result of decision block 320 will be NO (FALSE), and the logic will proceed to decision block 322, which will produce a YES (TRUE) result since a source tree corresponding to a list applet will include an RS_HEADER level. As a result, the style sheet processing will jump to Account List Applet RS_HEADER template 292 via code block 326, wherein the values pertaining to the RS_HEADER level would be copied from the source tree to the result tree in block 328. Next, in decision block 330 it would be determined that a Column level exists in the source tree. The result of this condition would be TRUE, causing the processing to finally jump to Account List Applet Column template 294, which contains a filter that will only allow data pertaining to the New, Name, and Main Phone # columns to be copied to the result tree.

Voice Update Support

The purpose of voice update support module 104 is to support grammar update for the voice application. The grammars are words or patterns of words that are listened for by a speech recognizer and other grammar processors that are part of the voice infrastructure and/or the voice application. The speech recognizer uses grammars to know what the user said and then passes the information to the voice application for further processing. In one respect, grammar fields are basically the subset of list columns defined in a list applet. For example, as the voice application is in the state of looking up an account, the voice user can say an account name and the speech recognizer will use the account name list that the voice user would normally view if he or she was connected to the enterprise data system via an HTML client as the grammar to understand what the voice user said. Then the voice application uses this account name to format the request and send it to the Siebel® Web Engine to get the detailed information of that account.

In order to support this paradigm, grammar data corresponding to various data columns must be accessible to voice application 14A. Preferably, this will be done by periodically retrieving data pertaining to those data columns from the enterprise data system via the mobile connector (or via another access means, such as a backend connection directly to database 38), and storing the retrieved data in a manner that is useable by the voice application and/or voice infrastructure 20 as grammar data. For example, the grammar data may be stored in a local (to the voice application) database. The specific implementation details for storing and accessing the grammar data will be familiar to those skilled in the voice access system arts and are outside the scope of the invention.

Voice update support module 104 supports dynamic grammar updates through exporting user data in XML format to the voice application. The output is generated by Web engine 110 based on the view and applet specified in the XML query request and uses grammar stylesheets to filter out information that is not required as grammars. The grammar style sheets are generated in the same manner as discussed above with reference to the voice style sheets, except that in this instance the selections in the Grammar Update Enable column of the application representation are used rather than the values in the Voice Enable column. The voice application can periodically check if there is any new/updated data (also refered to as "delta" data) which are used for grammar, and retrieve the delta changes if desired.

The retrieval of grammar information means getting the data of the subset of the list columns in the applet to which the update is to apply. This may be implemented with a new SWE method, GetVoiceGrammer, to retrieve the delta data that is based on the specified view and applet and the last update time that the periodic update was performed for that view and applet and use an appropriate grammar stylesheet (e.g., pertaining to the view) to filter the output for data only pertaining to grammars.

In one embodiment, the request parameters to web engine 106 for Voice Update Support should include the following information:

a. SWE Command Name, required
a. SWE Method Name, required
b. View Name, required
c. Applet Name, required
d. Last Update Time, optional For example if a voice application submits the command with the parameters below to the Web Engine:
SWECmd=InvokeMethod
SWEMethod=GetVoiceGrammar&
SWEView=Account List View&
SWEApplet=Account List Applet&
LastUpdate=Jan. 15, 2001
Where GetVoiceGrammar is a new command in the set of SWE commands;

SWEView specifies the view name;

SWEApplet specifies the applet names that have grammar fields defined;

LastUpdate specifies the last update time that the delta is based on;.

the SWE will return the list of account names that have been updated or added since Jan. 15, 2001. If the information of LastUpdate parameter is not provided, the voice update support module will return all grammar data pertaining to the view and applet.

In one embodiment, the output will be in XML format using the same output DTD (data type definition) normally implemented but it will contain only partial UI information. In case of an error during processing, the output will include the error message in an <ERROR> tag.

Figure 21:
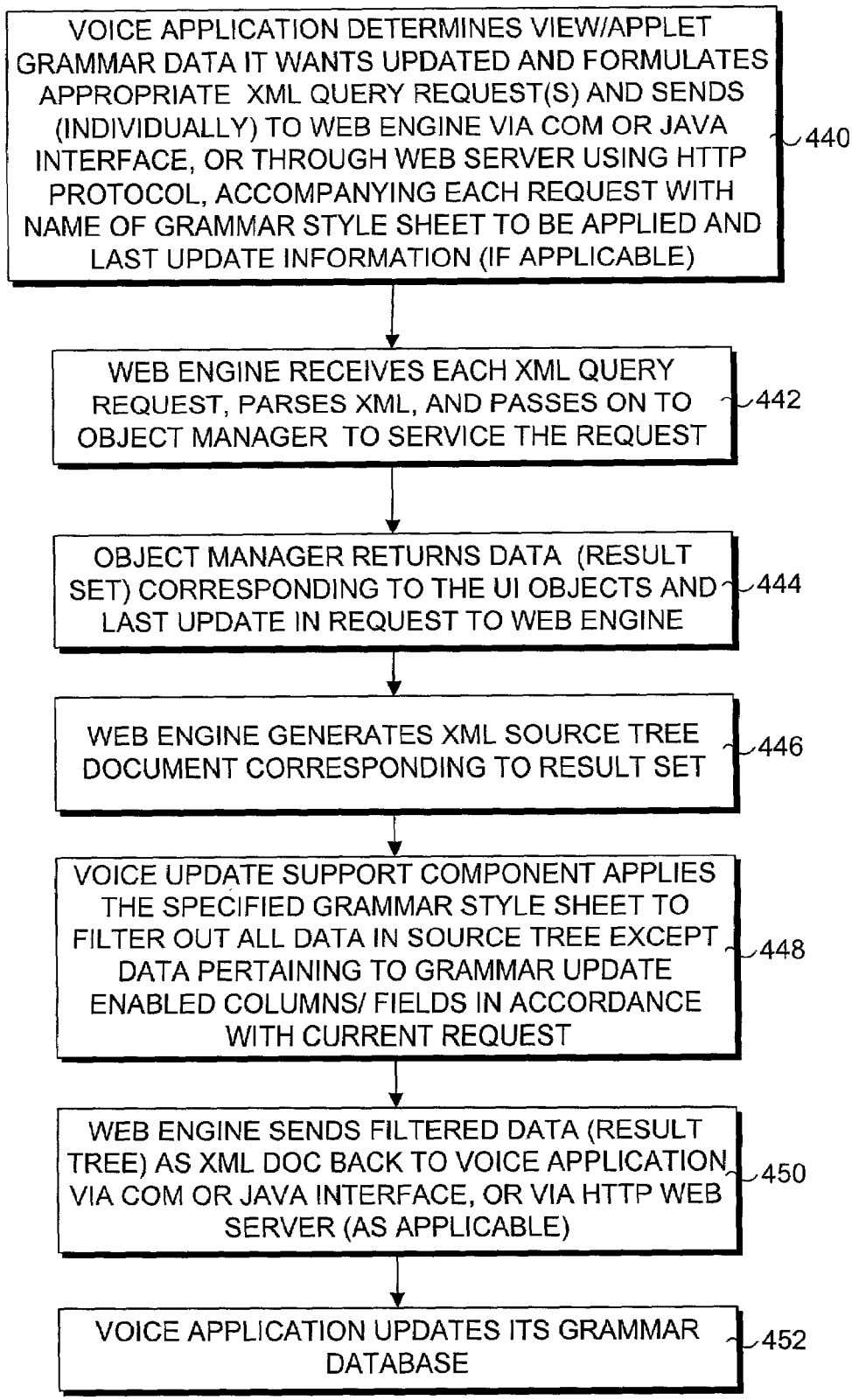
FIG. 21 is a flowchart illustrating the operations and logic used by one embodiment of the invention when providing a grammar update.

With reference to the flowchart of FIG. 21, an typical grammar update process will proceed as follows. In a block 440 the voice application determines which views and applets it wants to update grammar data for and formulates one or more XML queries requesting these data and send to the Web engine via the COM or Java interface or through the Web server using HTTP. Each request is accompanied with the name of the grammar style sheet that is to be appled and last update information, if applicable.

In response to receiving the XML query request, the Web engine parses the XML in a block 442 and passes on appropriate data to the object manager to service the request. The object manager then returns a result set corresponding to the request to the Web engine in a block 444. In a manner similar to that discussed above, the web engine generates an XML source tree document corresponding to the result set in a block 446, which is filtered by the voice update support component by using the specified grammar style sheet in a block 448 to produce an XML result tree that only includes data pertaining to columns and fields that were marked for update previously as defined by the grammar style sheet. The web engine then sends the filtered data as an XML document back to the voice application in a block 450, and the voice application updates its grammar database in a block 452.

Exemplary System Infrastructure

Figure 22:
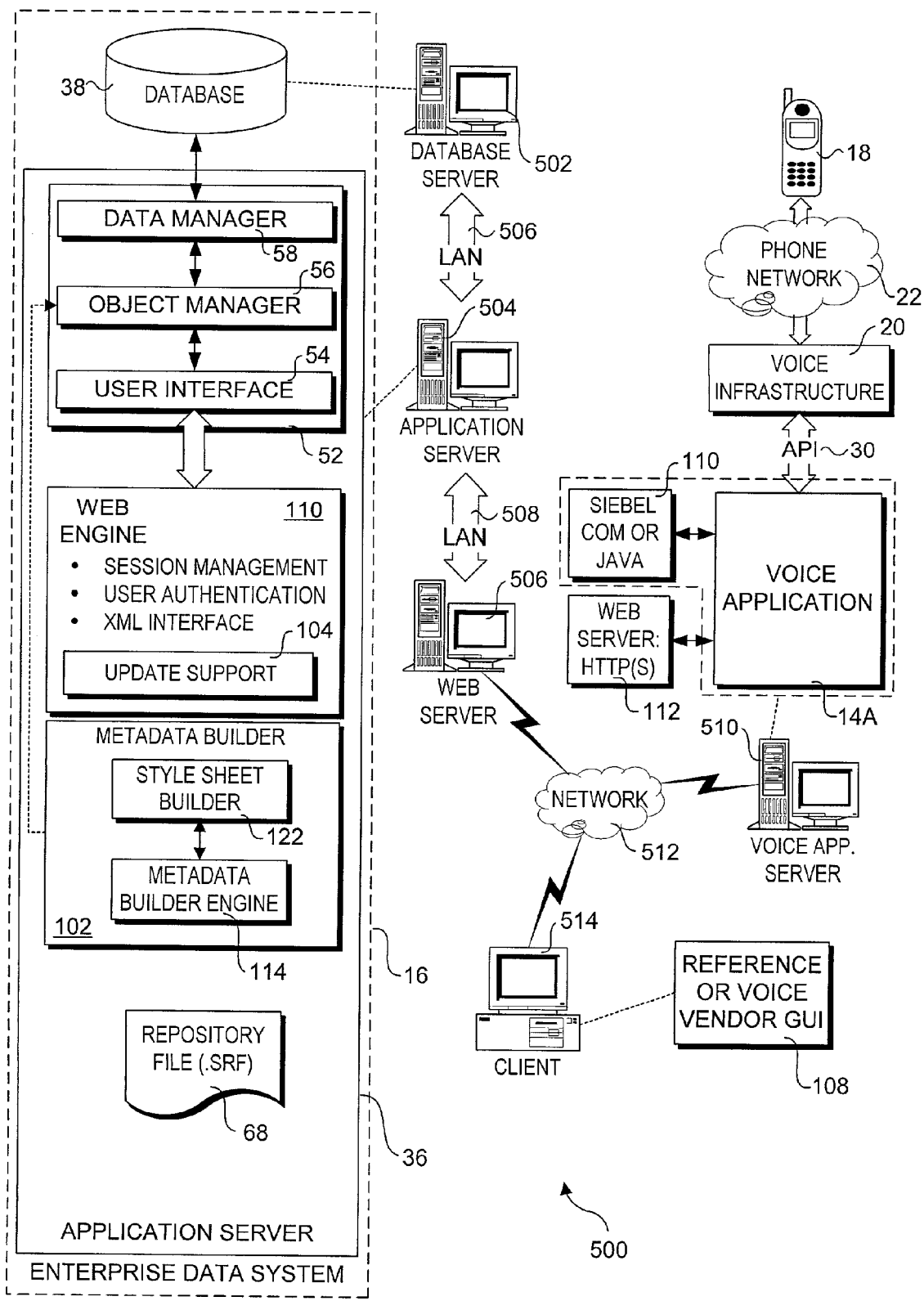
FIG. 22 is a block schematic diagram illustrating an exemplary hardware infrastructure for implementing one embodiment of the invention.

An exemplary system infrastructure 500 by which various embodiments of the invention described herein may be implemented is shown in FIG. 22. The enterprise data system side of system infrastructure 500 uses a well-known N-tier architecture, wherein one or more physical machines occupy each tier in the architecture. These tiers include a database tier, depicted by a database server 502, and application server tier, depicted by an application server 504, and a web server tier, depicted by a web server 506. Each of the machines in the N-tier architecture are linked in communication via a local area network (LAN) 508. Database server 502 is used to run an RDBMS (relation database management system) database server software component that hosts database 38. The RDBMS database server software will typically comprise a SQL database server that may be provided by one of several vendors, including Oracle (Oracle Enterprise 8*i* and 9*i*), Microsoft (SQL Server 7 or 2000), IBM (DB2), Sybase, or Informix. All of the components depicted in the block corresponding to application server 36 may be run in the application server tier. Optionally, all or a portion of the software associated with Web engine 110 may be run on web server 112.

On the voice application side, the architecture includes a voice application server 510 on which voice application 14A is run. The voice application server is linked to web server 508 via a computer network 512, such as a LAN, a WAN (wide area network) or via the Internet. Generally, the voice application server will be connected to another server that is part of voice infrastructure 20 via a LAN or the same machine may be used for both voice infrastructure operations and for serving the voice application. If the Siebel® COM or Java interface 110 is implemented, the client side of this software will typically be run on voice application server 510. If Web server 112 is used, software corresponding to this component may be run on the voice application server or a separate web server machine linked to the voice application server via a LAN (not shown).

As discussed above with reference to FIG. 7, in one embodiment reference or application vendor GUI 108 is supported by Web pages that are served to a client 514 via computer network 512. Alternative, the application vendor may create their own GUI (108) based on a language that supports the generation of interactive graphical user interfaces, such as C, C++, or Java, in which case the GUI component may be directly connected to application server 504 via a LAN or WAN connection (not shown).

The foregoing embodiments disclose particular details that are suitable for using the invention in connection with voice access systems. This is not meant to be limiting. For example, the architecture of the system enables an external application or system to access filtered data from data systems, such as an enterprise data system; the voice access system embodiments discussed above correspond to a particular implementation of the system, wherein the filtered data are used for voice access purposes. In instances in which filtered data are desired to be retrieved from a data system, rather than selecting UI objects to be voice-enabled, the system would permit users to select UI objects to be "pass-through" enabled (i.e., data pertaining to pass-through enabled UI objects would pass through the data filter mechanism), and corresponding subscription data would be generated in the same manner discussed above. An exemplary result of such subscription data is shown in FIG. 12A. From the external application's or system's standpoint, the operations for interacting with the data system via the mobile connector would appear substantially identical, whether the filtered data was ultimately used in a voice access system or for any other purpose.

The same is true for data updates. The principles and teachings disclosed in the exemplary implementation discussed above concerning grammar building and updating for use in a voice access system may be applied to other data building and updates implementations as well. In such instances, the user interfaces provided by the system or application vendor should reflect the type of data being updated. For example, in the GUI shown in FIG. 13, the "Subscribe for Grammar" labels might be replaced with "Subscribe for Update" or something similar to inform the user what is being selected for update. Accordingly, the subscription data would correspond to the data contained in the "Update Enable" column of FIG. 12A.

EXEMPLARY SERVER COMPUTER SYSTEM

Figure 23:
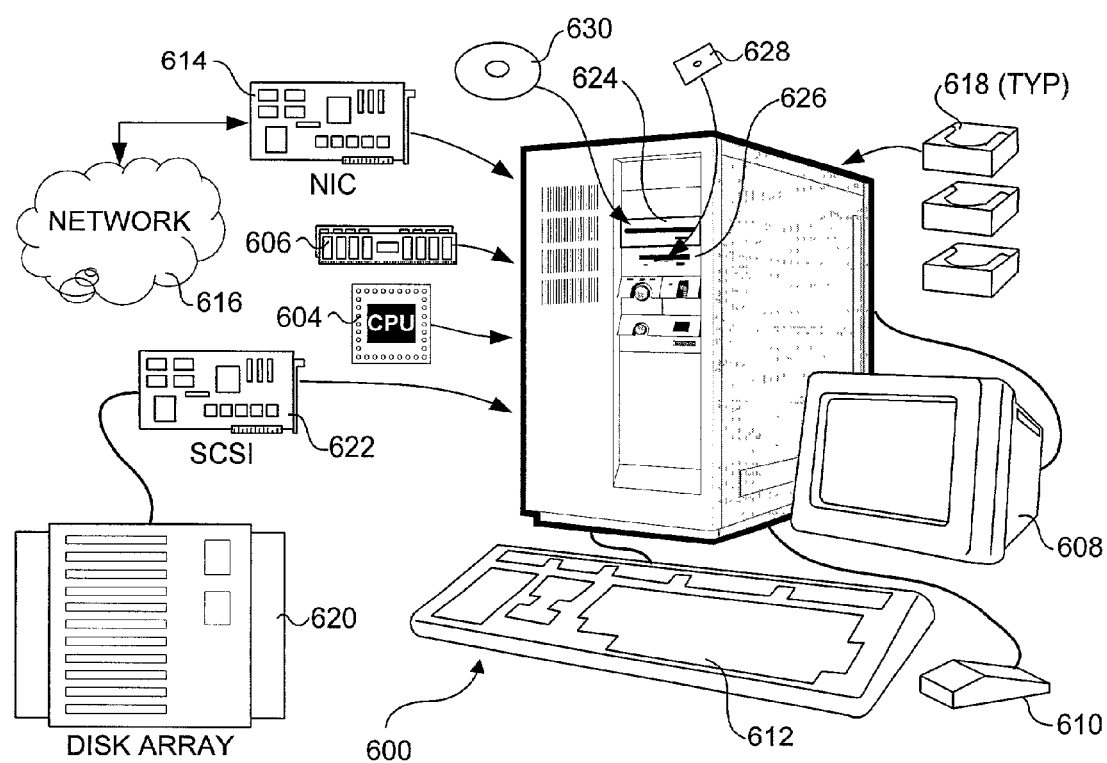
FIG. 23 is a schematic diagram illustrating various components of an exemplary computer server system that may be used for the various computer servers in the hardware infrastructure of FIG. 22 to implement the embodiments of the invention described herein.

With reference to FIG. 23, a generally conventional computer server 600 is illustrated, which is suitable for use in connection with practicing the present invention. For example, computer server 600 may be used for running application server software modules and components, including object manager 56, data manager 58, Web engine 106, voice update support 104, and voice metadata builder 102. The same or preferably a separate computer server of similar architecture may be used to host database 38. Similarly, the same or preferably a separate computer server of similar architecture may be used for Web server 112.Examples of computer systems that may be suitable for these purposes include stand-alone and enterprise-class servers operating UNIX-based and LINUX-based operating systems, as well as servers running the Windows NT or Windows 2000 Server operating systems.

Computer server 600 includes a chassis 602 in which is mounted a motherboard (not shown) populated with appropriate integrated circuits, including one or more processors 604 and memory (e.g., DIMMs or SIMMs) 606, as is generally well known to those of ordinary skill in the art. A monitor 608 is included for displaying graphics and text generated by software programs and program modules that are run by the computer server. A mouse 610 (or other pointing device) may be connected to a serial port (or to a bus port or USB port) on the rear of chassis 602, and signals from mouse 610 are conveyed to the motherboard to control a cursor on the display and to select text, menu options, and graphic components displayed on monitor 608 by software programs and modules executing on the computer. In addition, a keyboard 612 is coupled to the motherboard for user entry of text and commands that affect the running of software programs executing on the computer. Computer server 600 also includes a network interface card (NIC) 614, or equivalent circuitry built into the motherboard to enable the server to send and receive data via a network 616.

File system storage corresponding to the invention may be implemented via a plurality of hard disks 618 that are stored internally within chassis 602, and/or via a plurality of hard disks that are stored in an external disk array 620 that may be accessed via a SCSI card 622 or equivalent SCSI circuitry built into the motherboard. Optionally, disk array 620 may be accessed using a Fibre Channel link using an appropriate Fibre Channel interface card (not shown) or built-in circuitry.

Computer server 600 generally may include a compact disk-read only memory (CD-ROM) drive 624 into which a CD-ROM disk may be inserted so that executable files and data on the disk can be read for transfer into memory 606 and/or into storage on hard disk 618. Similarly, a floppy drive 626 may be provided for such purposes. Other mass memory storage devices such as an optical recorded medium or DVD drive may also be included. The machine instructions comprising the software program that causes processor(s) 604 to implement the functions of the present invention that have been discussed above will typically be distributed on floppy disks 628 or CD-ROMs 630 (or other memory media) and stored in one or more hard disks 618 until loaded into memory 606 for execution by processor(s) 604. Optionally, the machine instructions may be loaded via network 616 as a carrier wave file.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

APPENDIX

TABLE 1 provides and exemplary set of Siebel® Web Engine (SWE) commands that enable access to a Siebel® Enterprise Data System via an HTTP XML request. TABLE 2 provides various SWE methods that may be used to access the Siebel® Enterprise Data System via an HTTP XML request. TABLE 3 includes parameters that may be provided for the SWE commands and methods in an HTTP request to control the form and content of a returned XML document.

TABLE 1

| Command | Description | Required Arguments | Optional Arguments |
| --- | --- | --- | --- |
| GotoPageTab | Go to a Siebel screen. Will show the default view for the screen. | SWEScreen—name of the screen | None |
| GotoView | Go to a Siebel View. If the SWEPPostnApplet and SWEPostnRowID arguments are specified, it will execute a search for the specified rowID in the specified applet. If SWEQMApplet and SWEQMMethod arguments are specified, it will invoke the method after going to the view. | SWEView—name of the view. | SWEKeepContext—if TRUE, keeps the current business object context, when requesting to a view based on the same business object. SWEPostnApplet—name of the applet on which the search should executed. SWEPostnRowId—row Id to search for. SWEQMApplet—name of the QueueMethod applet. This is the applet where the method specified in SWEQMMethod should be invoked after going to the view. SWEQMMethod—name of the QueueMethod method. The method to be invoked. SWEQMArgs—arguments of the QueueMethod method. |
| InvokeMethod | Invoke a method on an applet, a business service, a business component, or the SWE application. The optional SWEService, SWEBusComp, and SWEApplet arguments are used to specify the Siebel object on which the method should be invoked. | SWEMethod—name of the method. | SWEService—name of the business service to invoke the method. SWEBusComp—name of the business component to invoke the method. SWEApplet—name of the applet to invoke the method. |

TABLE 2

| Method | Description | Required Arguments | Optional Arguments |
| --- | --- | --- | --- |
| CopyRecord | Performs initialization then calls CopyRecord on the business component. | None | None |
| CreateRecord | Performs initialization, then calls NewRecord on the business component. | None | None |
| Drilldown | Drilldown on the field as specified in the | SWEField: Specify the name of the applet field | None |

TABLE 2-continued

| Method | Description | Required Arguments | Optional Arguments |
|---|---|---|---|
| | argument SWEField. | that you want to drilldown on. The drilldown information is specified in the repository. | |
| EditRocord | Edit a record. | None | SWESeq: Specify the sequence number of the Edit template to show. You can have many Edit templates for an applet in Siebel Tools, each identified by the sequence number. |
| ExecuteQuery | Execute a query. The query spec of the fields is specified in the list of arguments. | None | List of arguments with name and value, where the name specifies the field name and the value specifies the field query spec. Will set field query spec before executing the query. |
| GotoView | Go to a Siebel view. If the SWEPostnApplet and SWEPostnRowId arguments are specified, will execute a search for the specified rowed in the specified applet. | SWETargetView—name of the view. | SWEKeepContext—if TRUE, keep the current business objects if going to a view that uses the same business object. SWEPostnApplet, name of the applet that the search should be executed on. SWEPostnRowId—rowId to search for. SWEQMApplet—name of QueueMethod applet. This is the applet where the method (as specified in SWEQMMethod) should be invoked after going to the view. SWEQMMethod—name of the QueueMethod method. The method to be invoked. SWEQMArgs—arguments of the QueueMethod method. |
| NewRecord | If the applet has an association applet, show the association popup applet. Otherwise, create a new record. | None | None |

TABLE 3

| Query Parameter | Description | Usage | Example |
|---|---|---|---|
| SWEGetApplet | This parameter is used to filter the outbound XML document so only the applet named as the value of the parameter will be allowed in the output. All other document content will be discarded. | 1. SWEGetApplet=<name of the applet> 2. <ARG NAME="SWEGetApplet">name of the applet</ARG> | 1. SWEGetApplet=Account+List+Applet 2. <ARG NAME="SWEGetApplet">Account List Applet</ARG> |
| SWESetMarkup | Temporarily set the markup language to use in the output document. | 1. SWESetMarkup=<name of the markup language> 2. <ARG NAME="SWESetMarkup">markup language</ARG> | 1. SWESetMarkup=HTML 2. <ARG NAME="SWESetMarkup">HTML</ARG> |

TABLE 3-continued

| Query Parameter | Description | Usage | Example |
|---|---|---|---|
| SWESetRowCnt | Temporarily set the workset size or row number of list applets in the view. | 1. SWESetRowCnt=<number of list rows><br>2. <ARG NAME="SWESetRowCnt">number of list rows</ARG> | 1. SWESetRowCnt=50<br>2. <ARG NAME="SWESetRowCnt">number of list rows</ARG> |
| SWESetNoTempl | Disable the use of templates during the generation of the outbound document. | 1. SWESetNoTempl={TRUE \| FALSE}<br>2. <ARG NAME="SWESetNoTempl">TRUE\|FALSE</ARG> | 1. SWESetNoTempl=TRUE<br>2. <ARG NAME="SWESetNoTempl">TRUE</ARG> |
| SWEDataOnly | Discard all UI content (including anchors) if set to TRUE. | 1. SWEDataOnly={TRUE \| FALSE}<br>2. <ARG NAME="SWEDataOnly">TRUE\|FALSE</ARG> | 1. SWEDataOnly=TRUE<br>2. <ARG NAME="SWEDataOnly">TRUE</ARG> |
| SWEXslStyleSheet | Specify the name of the XSLT stylesheet to use to perform the XSLT on the XML output document. | 1. SWEXslStyleSheet=<stylesheet name>. The stylesheet needs to be in the application's webtempl directory.<br>2. <ARG NAME="SWEXslStyleSheet">name of the XSLT stylesheet</ARG> | 1. SWEXslStyleSheet=ui.xsl<br>2. <ARG NAME="SWEXslStyleSheet">ui.xsl</ARG> |

What is claimed is:

1. A method for providing data from a data system, comprising:

providing a mechanism to enable a user to identify user interface (UI) objects corresponding to a user interface of an application used to access the data system to pass-through enable; and in response to a data query request submitted by a requestor to receive data from the data system corresponding to a navigation context within the user interface of the application, returning data from the data system to the requestor pertaining to UI objects corresponding to the navigation context that were identified to pass-through enable.

2. The method of claim 1, further comprising:

providing a filter mechanism to filter out data pertaining to UI objects that were not identified to pass-through enable, and, in response to the data query request, further performing the operations of:

retrieving an unfiltered set of data from the data system pertaining to the navigation context;

filtering the unfiltered set of data with the filter mechanism to create a filtered set of data; and returning the filtered set of data to the requestor, said filtered set of data comprising data from the data system pertaining to UI objects corresponding to the navigation context that were identified to pass-through enable.

3. The method of claim 2, wherein the filter mechanism implements an XSLT (extensible Style sheet Language transformation) style sheet containing logic to filter out any data pertaining to UI objects in the identified form that are not pass-through enabled.

4. The method of claim 3, wherein the data query request identifies a particular XSLT style sheet to be used by the filter mechanism.

5. The method of claim 3, further comprising automatically generating an XSLT style sheet for a set of one or more related forms based on UI objects corresponding to the forms that were identified to pass-through enable.

6. The method of claim 1, wherein the data query request identifies a row of data to be retrieved from a database that is used by the data system to store data.

7. The method of claim 1, wherein UI objects to pass-through enable are enabled to be identified by performing the operations of:

presenting indicia pertaining to UI objects corresponding to the user interface for the data system to a user via a computer user interface;

enabling the user to select which UI objects to pass-through enable via the computer user interface by marking the indicia corresponding to those UI objects.

8. The method of claim 7, wherein the computer user interface comprises a graphical user interface (GUI) that is generated by performing the operations of:

extracting metadata corresponding to the data system application, said metadata comprising object definitions for the UI objects of the user interface including a hierarchical position of each UI object within the user interface;

processing the metadata to build an application representation comprising an internal representation of the user interface of the data system application including data identifying the hierarchical position of each UI object; and rendering a hierarchical tree to provide a visual representation of the application representation.

9. A method to enable voice access to a data system, comprising:

identifying user interface (UI) objects to voice enable, said UI objects pertaining to a user interface that is provided by the data system to access data in the data system; and in response to receiving a data request from a voice application that identifies a navigation context of a user within the user interface for the data system,
retrieving data from the data system pertaining to the navigation context of the user; and
filtering the data retrieved from the data system to provide data pertaining to voice-enabled UI objects corresponding to the navigation context of the user to the voice application.

10. The method of claim 9, wherein the data request is received as an XML document.

11. The method of claim 9, wherein the data request includes commands to access the data system via an application program interface (API).

12. The method of claim 11, wherein the API comprises a Siebel® Web Engine API.

13. The method of claim 9, wherein the data are filtered by performing the operations of:
generating a source tree XML (extended markup language) document that includes an initial set of data retrieved from the data system in response to the data request; and
applying an XSLT (extensible Style sheet Language transformation) style sheet to the source tree XML document to produce an result tree XML document containing a filtered set of data.

14. The method of claim 9, wherein the UI objects to voice enable are identified by performing the operations of:
presenting indicia pertaining to respective UI objects of the user interface for the data system to a user via a computer user interface;
allowing the user to select which UI objects to voice enable via the computer user interface by marking the indicia corresponding to those UI objects.

15. The method of claim 14, wherein the computer user interface includes a first set of markable objects adjacent to respective UI object indicia to allow a user to select which UI object to voice enable and further includes a second set of markable objects to allow the user to select UI objects to provide grammar update support for, said UI objects that are selected being grammar-update enabled UI objects, further comprising:
in response to receiving a grammar update request from the voice access system that identifies a navigation context of the user interface to update grammar information for,
retrieving data from the data system pertaining to the navigation context; and
filtering the data retrieved from the data system to provide data pertaining to grammar update-enabled UI objects according to the navigation context to the voice access system.

16. The method of claim 14, wherein the computer user interface comprises a graphical user interface (GUI) and the indicia pertaining to the respective UI objects are presented to the user as a hierarchical tree corresponding to a hierarchical relationship of the UI objects in the user interface of the data system.

17. The method of claim 16, wherein selected levels in the hierarchical tree may be expanded or collapsed in response to a user input.

18. The method of claim 16, wherein the GUI is generated by performing the operations of:

storing metadata corresponding to the user interface for the data system, said metadata comprising object definitions for the UI objects of the user interface including a hierarchical position of each UI object within the user interface;
processing the metadata to build an application representation comprising an internal representation of the user interface of the data system including data identifying the hierarchical position of each UI object; and
rendering a hierarchical tree to provide a visual representation of the application representation.

19. The method of claim 18, wherein the application representation comprises an XML tree, further comprising:
sending the XML tree to a browser operating on a client machine that is linked in communication with the data system; and
rendering the hierarchical tree via the browser.

20. The method of claim 9, wherein the grammar update request further includes information identifying a last update for the navigation context, further comprising filtering data that are retrieved from the data system such that only grammar data in accordance with the navigation context that have changed since the last update are provided to the voice access system.

21. The method of claim 9, wherein the UI objects include objects pertaining to screens, views, applets, columns, and fields in the user interface of the data system.

22. The method of claim 9, wherein the filtered data are returned to the voice application as an XML document.

23. The method of claim 9, wherein UI object data is returned to the voice application in addition to the filtered data, said UI object data defining characteristics of one or more UI objects pertaining to the navigation context of the user.

24. The method of claim 23, wherein the UI object data include data pertaining to at least one of an operational mode of a UI object, a read-only attribute of a UI object, an insert attribute of a UI object, a delete attribute of a UI object, and an update attribute of a UI object.

25. The method of claim 9, wherein the data request includes size indicia identifying a number of records to be returned to the voice application at one time, and wherein additional records indicia is provided with the filtered data in an event in which a number of records for a given data request exceeds the number of records specified in the size indicia.

26. The method of claim 9, wherein field attribute data comprising attributes of one or more columns or fields of a UI object pertaining to the navigation context of the user are sent to the voice application along with the filtered data.

27. The method of claim 26, wherein the field attribute data include at least one of a data type, a text length, a field name, a required, and a format attribute.

28. The method of claim 9, wherein the data system provides a web interface having a URL address, and the data request is received via a computer network using the HTTP (Hypertext Transport Protocol) or HTTPS (Hypertext Transport Protocol Secured) protocol.

29. The method of claim 9, wherein the data request corresponds to a COM (component object model) interface provided by the data system.

30. The method of claim 29, wherein the COM interface enables selected data to be retrieved from a database in which data for the data system are stored by referencing a business component that is used to access one or more database tables in which those data are stored.

31. A computer readable medium on which a plurality of machine instructions are stored that when executed by a computing machine provides filtered data to a voice access system by performing the operations of:
 providing data to render a computer user interface by which a user may identify user interface (UI) objects to voice enable, said UI objects pertaining to a data system user interface that is provided by a data system from which the filtered data are retrieved to access data in the data system; and
 in response to receiving data from the data system pertaining to a data request from the voice access system that identifies a navigation context of a user within the user interface for the data system,
  filtering the data received from the data system to produce filtered data pertaining to voice-enabled UI objects corresponding to the navigation context of the user; and
  providing the filtered data to the voice access system.

32. The machine-readable media of claim 31, wherein execution of the machine-instructions filters the data by performing the operations of:
 generating a source tree XML (extended markup language) document that includes an initial set of data retrieved from the data system in response to the data request; and
 applying an XSLT (extensible Style sheet Language transformation) style sheet to the source tree XML document to produce an result tree XML document containing a filtered set of data.

33. The machine-readable media of claim 31, wherein the UI objects to voice enable are identified by performing the operations of:
 presenting indicia pertaining to respective UI objects of the user interface for the data system on the computer user interface;
 enabling the user to identity which UI objects to voice enable via the computer user interface by marking the indicia corresponding to those UI objects.

34. The machine-readable media of claim 33, wherein the computer user interface comprises a graphical user interface (GUI) and the indicia pertaining to the respective UT objects are presented to the user as a hierarchical tree corresponding to a hierarchical relationship of the UI objects in the user interface of the data system.

35. The machine-readable media of claim 34, wherein execution of the machine instructions generates the GUI by performing the operations of:
 retrieving metadata corresponding to the user interface for the data system, said metadata comprising object definitions for the UT objects of the user interface including a hierarchical position of each UT object within the user interface;
 processing the metadata to build an application representation comprising an internal representation of the user interface of the data system including data identifying the hierarchical position of each UI object; and
 providing data from which a hierarchical tree corresponding to the application representation can be rendered to provide a visual representation of the application representation.

36. The machine-readable media of claim 35, wherein the application representation comprises an XML tree, and execution of the machine instructions further performs the operations of:
 sending the XML tree to a browser operating on a client machine that is linked in communication with the data system; and
 rendering the hierarchical tree via the browser.

37. The machine-readable media of 33, wherein the computer user interface includes a first set of markable objects adjacent to respective UT object indicia to allow a user to select which UI object to voice enable and further includes a second set of markable objects to allow the user to select UI objects to provide grammar update support for, said UI objects that are selected being grammar-update enabled UI objects, and wherein execution of the machine instructions further performs the operations of:
 in response to receiving a grammar update request from the voice access system that identifies a navigation context of the user interface to update grammar information for,
  retrieving data from the data system pertaining to the navigation context; and
  filtering the data retrieved from the data system to provide data pertaining to grammar update-enabled UI objects according to the navigation context to the voice access system.

38. The machine-readable media of claim 37, wherein the grammar update request further includes information identifying a last update for the navigation context, and wherein the data retrieved from the data system are filtered such that only grammar data corresponding to grammar update-enabled UI objects in accordance with the navigation context that have changed since the last update are provided to the voice access system.

39. The machine-readable media of claim 31, wherein the UI objects include objects pertaining to screens, views, applets, columns, and fields in the user interface of the data system.

40. The machine-readable media of claim 31, wherein the filtered data are returned to the voice application as an XML document.

41. The machine-readable media of claim 31, wherein the data request includes size indicia identifying a number of records of filtered data to be returned to the voice access system at one time, and wherein additional records indicia is provided with the filtered data in an event in which a number of records for a given data request exceeds the number of records specified in the size indicia.

42. A computer readable medium on which a plurality of machine instructions are stored that when executed by a computing machine provides filtered data by performing the operations of:
 providing data to render a computer user interface by which a user may identify user interface (UI) objects in forms corresponding to a user interface of an application used to access the data system to pass-through enable;
 generating a filter mechanism to filter out underlying data pertaining to UI objects contained in the forms that were not identified to pass-through enable; and
 in response to a data query request from a requestor requesting to retrieve data from the data system meeting a query criteria provided with the data query request,
  said query criteria identifying a form to which the requested data pertain,
  receiving an unfiltered set of data from the data system based on the query criteria;

filtering the unfiltered set of data with the filter mechanism to create a filtered set of data; and returning the filtered set of data to the requestor, the filtered set of data including data meeting the query criteria and pertaining to UI objects that are pass-through enabled.

43. The machine-readable media of claim 42, wherein the filter mechanism implements an XSLT (extensible Style sheet Language transformation) style sheet containing logic to filter out any data pertaining to UI objects in the identified form that are not pass-through enabled.

44. The machine-readable media of claim 41, wherein the data query request identifies a particular XSLT style sheet to be used by the filter mechanism.

45. The machine-readable media of claim 41, wherein execution of the machine instructions further performs the operation of automatically generating an XSLT style sheet for a set of one or more related forms based on UI objects corresponding to the forms that were identified to pass-through enable.

46. The machine-readable media of claim 42, wherein the computer user interface includes indicia pertaining to UI objects contained in respective forms corresponding to the user interface for the data system, and a user is enabled to identify which UI objects to pass-through enable by marking the indicia corresponding to those UI objects via the computer user interface.

47. The machine-readable media of claim 46, wherein the computer user interface comprises a graphical user interface (GUI), and execution of the machine instructions generates the GUI by performing the operations of:

retrieving metadata corresponding to the user interface for the data system, said metadata comprising object definitions for the UI objects of the user interface including a hierarchical position of each UI object within the user interface;

processing the metadata to build an application representation comprising an internal representation of the user interface of the data system including data identifying the hierarchical position of each UI object; and providing data from which a hierarchical tree corresponding to the application representation can be rendered to provide a visual representation of the application representation.

48. The machine-readable media of claim 47, wherein the application representation comprises an XML tree, and execution of the machine instructions further performs the operations of:

sending the XML tree to a browser operation on a client machine that is linked in communication with the data system; and rendering the hierarchical tree via the browser.

\* \* \* \* \*